US011625264B2

(12) United States Patent
Rosenberg et al.

(10) Patent No.: US 11,625,264 B2
(45) Date of Patent: Apr. 11, 2023

(54) INCREASING BLADE UTILIZATION IN A DYNAMIC VIRTUAL ENVIRONMENT

(71) Applicant: AT&T Intellectual Property I, L.P., Atlanta, GA (US)

(72) Inventors: Eric Rosenberg, Lincroft, NJ (US); Kartik Pandit, Aberdeen, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/590,162

(22) Filed: Feb. 1, 2022

(65) Prior Publication Data

US 2022/0156104 A1 May 19, 2022

Related U.S. Application Data

(63) Continuation of application No. 16/801,829, filed on Feb. 26, 2020, now Pat. No. 11,275,604, which is a
(Continued)

(51) Int. Cl.
*G06F 15/16* (2006.01)
*G06F 9/455* (2018.01)
(Continued)

(52) U.S. Cl.
CPC .......... *G06F 9/45558* (2013.01); *G06F 9/505* (2013.01); *G06F 9/5077* (2013.01);
(Continued)

(58) Field of Classification Search
CPC .... G06F 9/45558; G06F 9/505; G06F 9/5077; G06F 9/5088; G06F 2009/4557; G06F 2009/45595; H04L 41/5041
(Continued)

(56) References Cited

U.S. PATENT DOCUMENTS 7,962,587 B2 6/2011 Tripathi
7,970,905 B2 6/2011 Baskaran et al.
(Continued)

FOREIGN PATENT DOCUMENTS

CN 102662757 A 9/2012
CN 103095821 B 7/2015
(Continued)

OTHER PUBLICATIONS

U.S. Appl. No. 16/047,571, filed Jul. 27, 2018.
(Continued)

*Primary Examiner* — Moustafa M Meky
(74) *Attorney, Agent, or Firm* — Amin, Turocy & Watson, LLP

(57) ABSTRACT

Mobility service providers and others can use cloud platforms to meet customer demand. Due to changing demand or changing technology numerous issues arise. For example, server utilization within the cloud platform can become less efficient over time. As another example, virtual machines and virtual network functions processed by the cloud platform typically need to be extensively tested and certified, which can be expensive. Moreover, intra-platform communication can play a significant role in the costs to operate a cloud platform. Techniques detailed herein can address many of these issues, e.g., by providing mechanisms for increasing host or server utilization in response to changing demand, introducing a container technique for virtual machines to mitigate testing costs, and modeling bandwidth resources.

20 Claims, 15 Drawing Sheets

Related U.S. Application Data continuation of application No. 16/047,571, filed on Jul. 27, 2018, now Pat. No. 10,620,987.

(51) Int. Cl.
  *G06F 9/50* (2006.01)
  *H04L 41/5041* (2022.01)
(52) U.S. Cl.
  CPC ........ *G06F 9/5088* (2013.01); *H04L 41/5041* (2013.01); *G06F 2009/4557* (2013.01); *G06F 2009/45595* (2013.01)
(58) Field of Classification Search
  USPC ........................................................ 709/203
  See application file for complete search history.

(56) References Cited

U.S. PATENT DOCUMENTS

| | | | |
|---|---|---|---|
| 8,095,661 B2 | 1/2012 | Tripathi | |
| 8,099,615 B2 | 1/2012 | Tripathi | |
| 8,225,118 B2 | 7/2012 | Ishikawa | |
| 8,291,411 B2 | 10/2012 | Beaty et al. | |
| 8,478,878 B2 | 7/2013 | Freimuth et al. | |
| 8,549,127 B2 | 10/2013 | Chhuor et al. | |
| 8,578,217 B2 | 11/2013 | Chen et al. | |
| 8,756,609 B2 | 6/2014 | Dasgupta et al. | |
| 9,021,477 B2 | 4/2015 | Choudhury et al. | |
| 9,207,961 B2 | 12/2015 | Conrad et al. | |
| 9,342,373 B2 | 5/2016 | Hansson et al. | |
| 9,354,905 B2 | 5/2016 | Nakagawa | |
| 9,363,190 B2 | 6/2016 | Beloglazov et al. | |
| 9,367,344 B2* | 6/2016 | Udupi | G06F 9/45558 |
| 9,372,707 B2 | 6/2016 | Chigusa et al. | |
| 9,385,918 B2 | 7/2016 | Civilini et al. | |
| 9,462,427 B2 | 10/2016 | Patel et al. | |
| 9,712,591 B2 | 7/2017 | Bragstad et al. | |
| 9,716,738 B2 | 7/2017 | Bragstad et al. | |
| 9,733,971 B2 | 8/2017 | Cropper et al. | |
| 9,747,136 B2 | 8/2017 | Sathyamurthy et al. | |
| 9,766,945 B2 | 9/2017 | Gaurav et al. | |
| 9,785,474 B2 | 10/2017 | Cropper et al. | |
| 9,806,975 B2 | 10/2017 | Xiang | |
| 9,830,566 B1* | 11/2017 | Dailianas | G06Q 40/025 |
| 9,858,123 B1* | 1/2018 | Dailianas | G06F 9/50 |
| 9,891,946 B2 | 2/2018 | Bavishi et al. | |
| 9,929,931 B2 | 3/2018 | Breitgand et al. | |
| 10,148,684 B2* | 12/2018 | Joy | G06F 9/5077 |
| 10,243,815 B2 | 3/2019 | Shapsa et al. | |
| 10,275,286 B2* | 4/2019 | Chen | G06F 9/5077 |
| 10,303,520 B2 | 5/2019 | Shim et al. | |
| 10,346,775 B1* | 7/2019 | Xu | G06F 9/5027 |
| 10,620,987 B2 | 4/2020 | Rosenberg et al. | |
| 11,386,371 B2* | 7/2022 | Xu | H04L 41/00 |
| 2009/0172125 A1 | 7/2009 | Shekhar et al. | |
| 2013/0031545 A1 | 1/2013 | Choudhury et al. | |
| 2013/0031550 A1 | 1/2013 | Choudhury et al. | |
| 2013/0138812 A1 | 5/2013 | Assuncao et al. | |
| 2015/0143366 A1 | 5/2015 | Suragi Math et al. | |
| 2015/0169337 A1 | 6/2015 | Abali et al. | |
| 2015/0331702 A1 | 11/2015 | Bragstad et al. | |
| 2016/0034289 A1 | 2/2016 | Amano et al. | |
| 2016/0162338 A1 | 6/2016 | Sathyamurthy et al. | |
| 2016/0216991 A1 | 7/2016 | Ansari et al. | |
| 2017/0220394 A1 | 8/2017 | Shim et al. | |
| 2017/0344394 A1 | 11/2017 | Ansari et al. | |
| 2018/0267833 A1* | 9/2018 | Chen | G06F 9/45558 |
| 2019/0171483 A1* | 6/2019 | Santhar | G06F 9/4881 |
| 2019/0173770 A1* | 6/2019 | Gill | H04L 67/1097 |
| 2019/0250960 A1 | 8/2019 | Zhang et al. | |
| 2019/0286495 A1 | 9/2019 | Shim et al. | |
| 2022/0156661 A1* | 5/2022 | Xu | H04L 41/0826 |

FOREIGN PATENT DOCUMENTS

| | | |
|---|---|---|
| JP | 2010-176178 A | 8/2010 |
| WO | 2015/048384 A1 | 4/2015 |
| WO | 2018/014933 A1 | 1/2018 |

OTHER PUBLICATIONS

U.S. Appl. No. 16/801,829, filed Feb. 26, 2020.
Bobroff et al., "Dynamic Placement of Virtual Machines for Managing SLA Violations," 2007, pp. 119-128, IEEE, 10 pages.
Verma et al., "pMapper: Power and Migration Cost Aware Application Placement in Virtualized Systems", 2008, pp. J43-264, 22 pages.
Wood et al., "Black-box and Gray-box Strategies for Virtual Machine Migration" 4th USENIX Symposium on Networked Systems Design & Implementation, 2007, 22 pages.
Khanna et al., "Application Performance Management in Virtualized Server Environments," 2006, pp. 373-381, IEEE, 9 pages.
Nathuji et al., VirtualPower: Coordinated Power Management in Virtualized Enterprise Systems, 2007, pp. 265-278, ACM, 14 pages.
Lama et al., "Autonomic Performance and Power Control for Co-localed Web Applications on Virtualized Servers," 2013, 10 pages.
Desmarais, "Adaptive Solutions to Resource Provisioning and Task Allocation Problems for Cloud Computing," 2006, 163 pages.
Notice of Allowance received for U.S. Appl. No. 16/047,571 dated Nov. 27, 2019, 22 pages.
Non-Final Office Action received for U.S. Appl. No. 16/801,829 dated Aug. 5, 2021, 23 pages.

* cited by examiner

| VM Index | Host 1 | Host 2 | Host 3 | Host 4 | Host 5 |
|---|---|---|---|---|---|
| 1 | 1 | 0 | 0 | 0 | 0 |
| 2 | 1 | 0 | 0 | 0 | 0 |
| 3 | 0 | 0 | 0 | 1 | 0 |
| 4 | 0 | 0 | 0 | 1 | 0 |
| 5 | 0 | 0 | 0 | 0 | 1 |
| 6 | 1 | 0 | 0 | 0 | 0 |
| 7 | 0 | 1 | 0 | 0 | 0 |
| 8 | 0 | 0 | 0 | 0 | 1 |
| 9 | 0 | 0 | 1 | 0 | 0 |
| 10 | 0 | 1 | 0 | 0 | 0 |

FIG. 15

INCREASING BLADE UTILIZATION IN A DYNAMIC VIRTUAL ENVIRONMENT

RELATED APPLICATIONS

The subject patent application is a continuation of, and claims priority to each of, U.S. patent application Ser. No. 16/801,829, filed Feb. 26, 2021, and entitled "INCREASING BLADE UTILIZATION IN A DYNAMIC VIRTUAL ENVIRONMENT," which is a continuation of U.S. patent application Ser. No. 16/047,571 (now U.S. Pat. No. 10,620,987), filed Jul. 27, 2018, and entitled "INCREASING BLADE UTILIZATION IN A DYNAMIC VIRTUAL ENVIRONMENT," the entireties of which applications are hereby incorporated by reference herein.

TECHNICAL FIELD

The present application relates generally to increasing utilization of server devices (e.g., blades or hosts) in a dynamic virtual environment in which the server devices host virtual machines that are frequently instantiated or terminated to meet changing demand.

BACKGROUND

Due in part to a potential for reduced costs and overall performance enhancements, traditional networking has been evolving toward software-defined networking (SDN) and/or networks that operate according to a network functions virtualization (NFV) protocol in which virtual machines located in a cloud or virtual environment can perform processing or functions that were previously performed by local custom hardware devices.

BRIEF DESCRIPTION OF THE DRAWINGS

Numerous aspects, embodiments, objects and advantages of the various embodiments will be apparent upon consideration of the following detailed description, taken in conjunction with the accompanying drawings, in which like reference characters refer to like parts throughout, and in which:

FIG. 15 depicts a block diagram illustrating a more comprehensive example of rearrangements in which ten VMs are instantiated on five hosts in accordance with certain embodiments of this disclosure.

DETAILED DESCRIPTION

Overview

Figure 1:
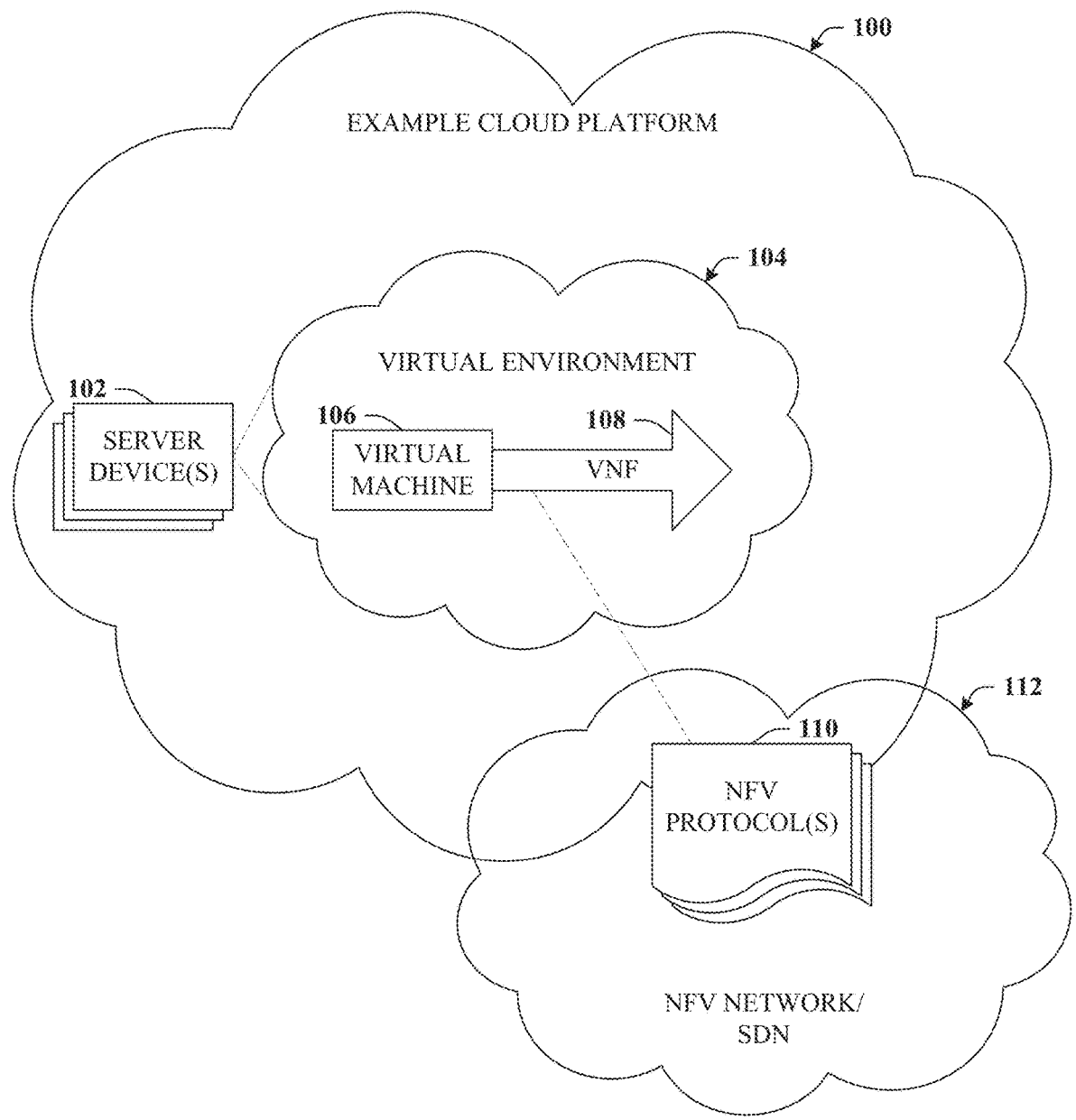
FIG. 1 depicts a block diagram illustrating an example cloud platform in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In order to better understand the subject matter detailed herein, it can be instructive to consider a high-level example cloud platform. FIG. 1 illustrates an example cloud platform 100 in accordance with certain embodiments of this disclosure. Cloud platform 100 can comprise a significant number of server devices 102, which are also referred to herein as blades or hosts. These server devices 102 can be housed in one or more data centers that can be geographically disparate. In some embodiments, geographically disparate data centers can provide services to designated geographic zones.

Figure 12:
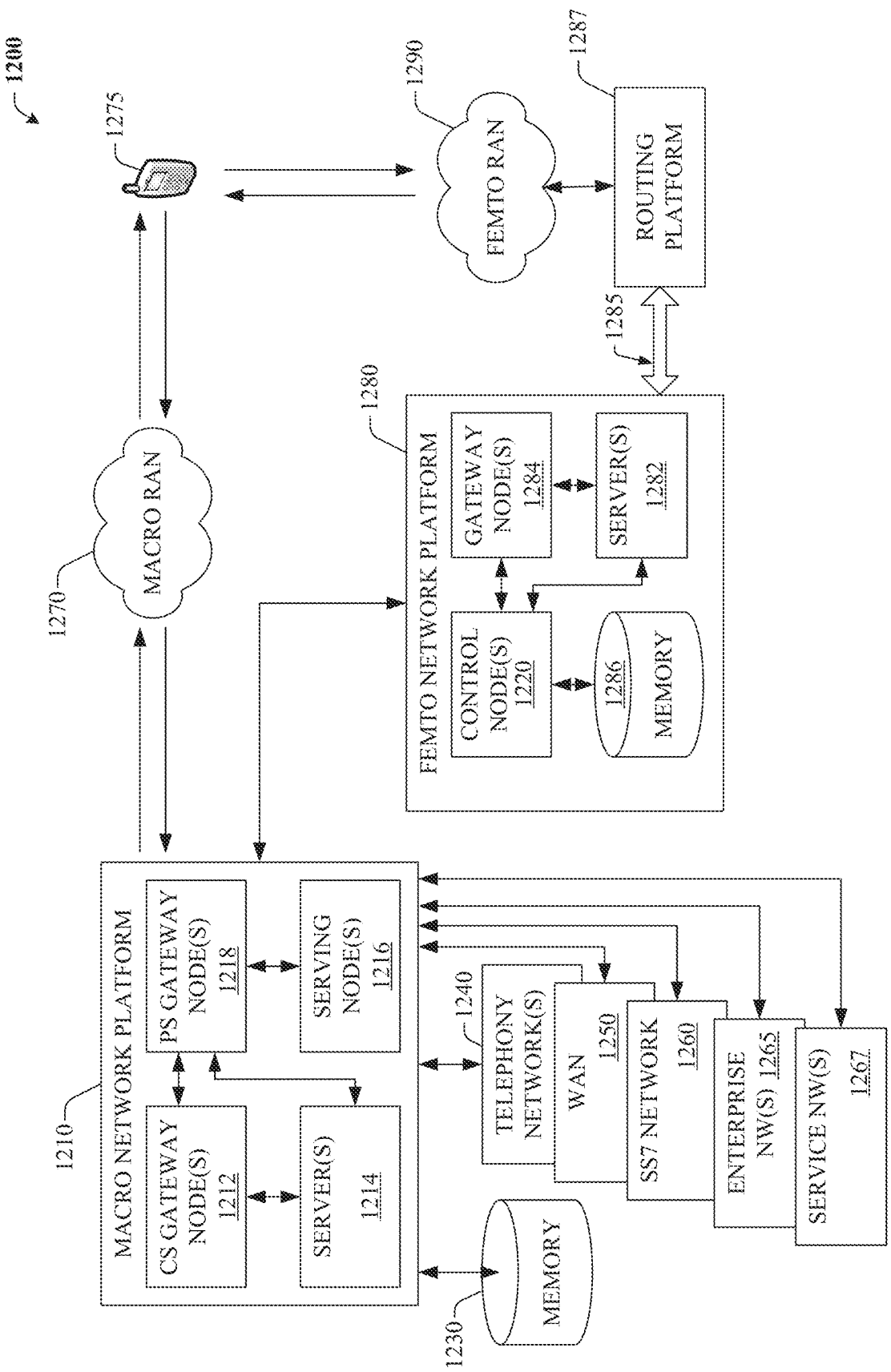
FIG. 12 illustrates a first example of a wireless communications environment with associated components that can represent architectures or functions that are virtualized in accordance with certain embodiments of this disclosure.
Figure 13:
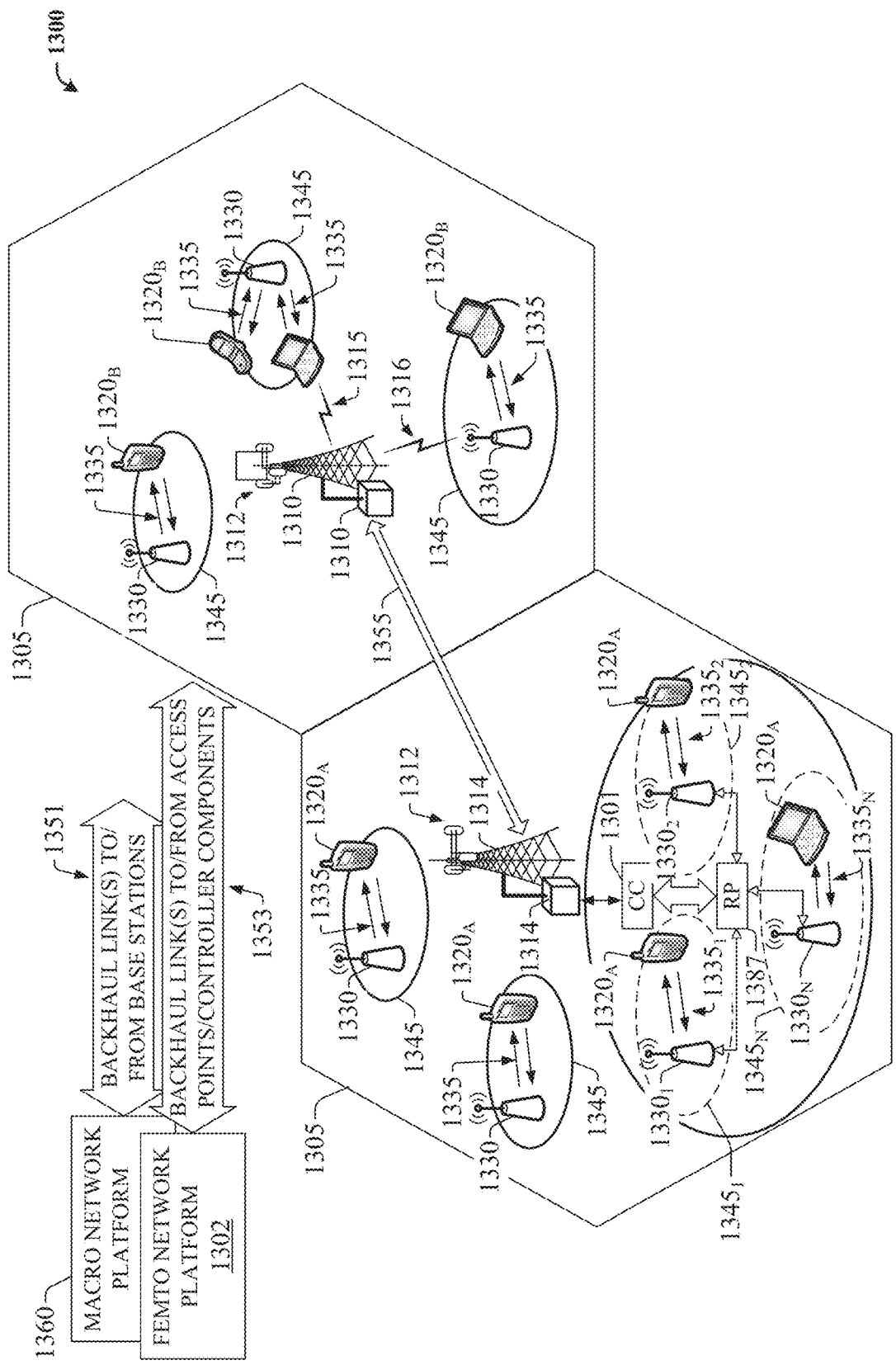
FIG. 13 illustrates a second example of a wireless communications environment with associated components that can represent architectures or functions that are virtualized in accordance with certain embodiments of this disclosure.

The server devices 102 can create a virtual environment 104 in which one or more virtual machines 106 can be instantiated. Virtual machine 106 can be configured to execute a virtual network function (VNF) 108 according to a network functions virtualization (NFV) protocol 110. NFV protocol 110 can define virtualization of various network components (e.g., gateways, firewalls, proxies, nodes, switches, interfaces, etc.), which can be implemented in virtual environment 104 via VNF 108. FIGS. 12 and 13 illustrate examples of communication architectures and functions, a portion of which can be virtualized as VNFs 108. In some embodiments, cloud platform 100 can interface with numerous other networks such as a cellular network, a wide area network (e.g., the Internet), a virtual private network (VPN), an NFV network 112 or a network that operates according to a software-defined networking (SDN) protocol.

Figure 2:
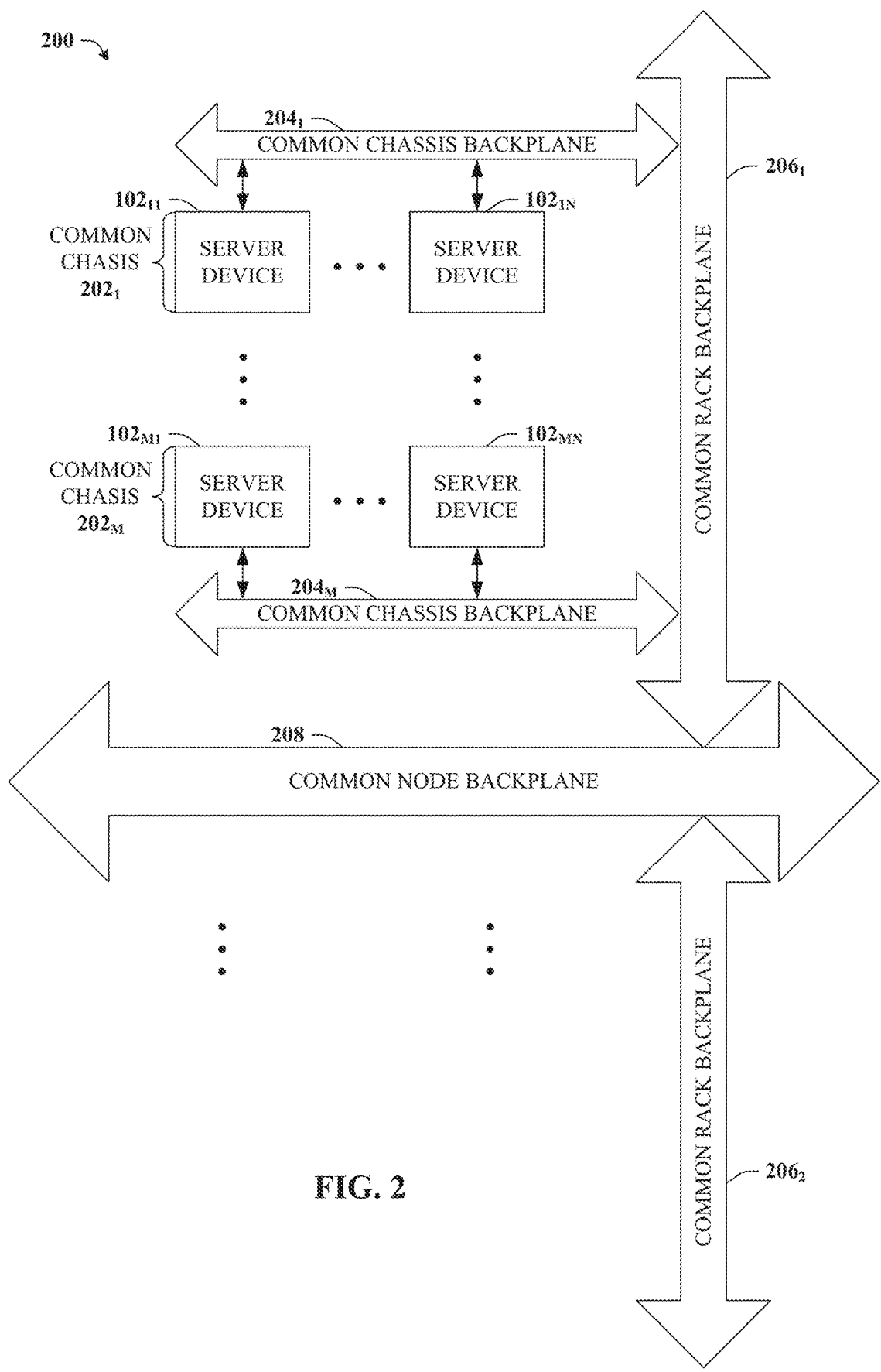
FIG. 2 is a block diagram illustrating an example array of server devices in accordance with certain embodiments of this disclosure.

FIG. 2 illustrates example array 200 of server devices 102 in accordance with certain embodiments of this disclosure. For example, within a given data center or other housing a large number of server devices 102 are packed together according to one or more hierarchical schemes. As one non-limiting example, a given set or group of N server devices $102_{11}$-$102_{1N}$ can be arranged on a common chassis $202_1$, where N can be any positive integer. Some positive integer, M, chasses 202 can exist, which collectively represent a rack. Multiple racks can aggregate to represent a higher level of the hierarchy and so on to the entire data center, which might be referred to as a node, or to multiple data centers (e.g., clusters) or some other terminology or hierarchical definition.

It is observed that regardless of the nomenclature used or the hierarchical scheme employed, communication between individual server devices 102 is tied to the architecture of array 200. For example, server device $102_{11}$ can communicate with server device $102_{1N}$ via common chassis backplane $204_1$. However, to communicate with server device $102_{M1}$, common rack backplane $206_1$ and common chassis backplane $204_M$ are utilized as well. Communication with other server devices 102 can rely on other, potentially higher hierarchy structure such as common rack backplane $206_2$, common node backplane 208, or others.

These and other considerations are further detailed in connection with FIGS. 8 and 9, but it is noted that communication between two server devices 102 located on a common chassis 202 (or some other lower hierarchy level) can be less expensive in terms of bandwidth resources than communication between server devices 102 that do not share a common chassis 202, with the cost of bandwidth resources increasing with greater hierarchical distance between the two server devices 102.

The disclosed subject matter, in some embodiments, is directed to techniques to optimize or increase utilization of server devices 102 (e.g., blades) in a dynamic virtual environment (e.g., virtual environment 104). A dynamic virtual environment can be one in which VMs 106 are turned up (e.g., instantiated on server device 102) or turned down (execution of the VM 106 is terminated) in response to changing customer demands. Due in part to these changing demands, utilization of resources provided by server devices 102 tends to become less efficient over time, which is further detailed in connection with FIGS. 4A-C. Thus, a technological problem exists in optimizing or increasing server device 102 utilization in a dynamic environment in which VMs 106 are instantiated and destroyed in response to customer demand.

According to previous techniques, an additional server device 102 may be used to instantiate a newly requested VM 106. However, according to the disclosed techniques, existing VMs 106 can instead be more efficiently arranged such that the new VM 106 can be accommodated without using the additional server device 102, thereby increasing blade utilization. In some embodiments, one element of the disclosed techniques is a capability to identify reassignments, in which a VM 106 is reassigned from one server device 102 to another. Such reassignments can result in recovery of blocks of capacity of a given set of resources (e.g., vCPU, RAM, non-volatile memory, ephemeral storage, network interface connections, sessions, etc.), so that use of additional server devices 102 is reduced or minimized in the face of changing demand.

In addition to reducing the number of server devices 102 that are utilized, the disclosed techniques can achieve several other, potentially orthogonal, objectives. For example, a rearrangement solution that is identified to reduce server device 102 utilization can be further selected based on minimizing or reducing operations costs of the rearrangement solution. The operations costs can relate to a cost of implementing the rearrangement solution by evacuating a VM 106 from one server device 102 and re-instantiating that VM 106 on a different server device 102.

As noted, in a virtual environment 104, VNF 108 can be implemented by VM 106. A given VNF 108 (e.g., a gateway VNF) might require or use several instances of different VMs 106. Typically, these different VMs 106 can communicate with one another during execution of VNF 108, so placing those VMs 106 on different server devices 102 can incur a communication cost (e.g., a bandwidth resource cost), which can be a function of the hierarchy introduced at FIG. 2. In some embodiments, the rearrangement solution can be selected based on minimization or reduction of communication costs. FIGS. 8 and 9 relate to concepts directed to communications costs and modeling costs associated with inter-VM and inter-chassis bandwidth, e.g., due to placing VMs on different server devices of a given chassis, rack, etc.

In some embodiments, the rearrangement solution can be further determined based on cloud platform primitives or constraints such as affinity rules or availability zones, which is further discussed with reference to FIG. 5.

The disclosed techniques further relate to a new approach to instantiating VMs on server devices of a cloud platform that can lead to additional efficiencies. For example, rather than a plugging directly into a server device, a VM can be instantiated within a container, which plugs into the server device. This container can be referred to as a flavor, and different flavors can represent containers with different characteristics. The "dimensions" of a flavor (e.g., container) can be specified in terms of allocation of resources, and one or more VMs can be mapped to a given flavor, where the resource requirements of these multiple VMs can fit inside the given flavor. A significant cost of operating a cloud platform relates to testing and certification of all the various VMs that will be instantiated. An efficiency that can be realized in connection with flavors is that testing and certification can be performed on the flavors instead of the VM's. Since the number of flavors utilized can be significantly less than the number of VM's, testing and certification costs can be reduced.

As the disclosed techniques can provide unconventional technological solutions to several different technological problems, systems of this disclosure are logically separated into three parts. The first part discusses FIGS. 3-5 and relates in part to determining a rearrangement solution that can increase the efficiency of blade (e.g., server device) utilization. The second part discusses FIGS. 6 and 7 and relates in part to a front end assignment in which VMs can be assigned to flavors and a potentially optimal set of flavors are determined. The third part discusses FIGS. 8 and 9 and relates in part to modeling bandwidth costs in the context of VNFs.

Example Systems for Reducing the Number of Server Devices

Figure 3:
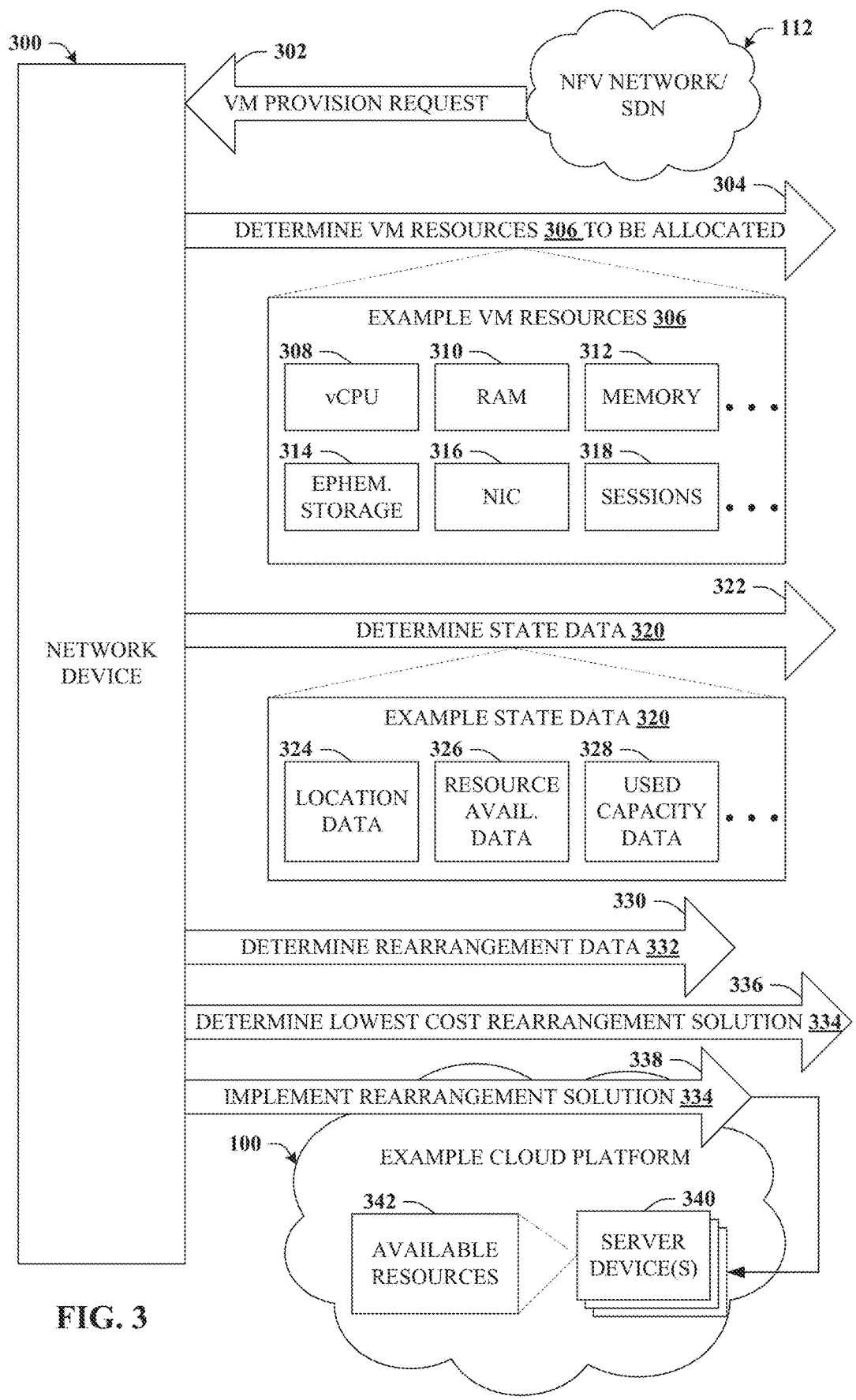
FIG. 3 depicts a block diagram of an example network device that can determine a rearrangement solution that rearranges existing VMs in accordance with certain embodiments of this disclosure.

Referring again to the drawings, with reference now to FIG. 3, a block diagram of an example network device 300 is illustrated. Network device 300 can determine a rearrangement solution that rearranges existing VMs in accordance with certain embodiments of this disclosure. The rearrangement solution can effectively move a VM from one server device to another server device, which can result in recovering blocks of unused resources that can then be used to instantiate additional VMs. Generally, network device 300 can comprise a processor and a memory that stores executable instructions that, when executed by the processor, facilitate performance of operations. Examples of the memory and processor can be found with reference to FIG. 14. It is to be appreciated that the computer 1402 can represent a server device of a communications network or a user equipment device and can be used in connection with implementing one or more of the systems, devices, or components shown and described in connection with FIG. 3 and other figures disclosed herein.

In some embodiments, network device 300 can be included in cloud platform 100. For example, network device 300 can be a server device 102. In some embodiments, network device 300 can be included in NFV network 112 or another network that operates according to SDN. In some embodiments, network device can be remote from and operatively coupled to cloud platform 100 can NFV network 112.

Network device 300 can receive request 302 that can represent a request to provision a virtual machine 102 within a virtual environment (e.g., virtual environment 104). VM 106 can be configured to execute VNF 108 according to NFV protocol 110. In some embodiments request 302 can be received from NFV network 112 or from another suitable source that generates request 302 to instantiate VM 106 as well as requests to terminate existing VMs in response to customer demand. Based at least in part on customer demand, the type of VM 106 that is requested can vary. However, each VM 106 can have defined amounts of resources 306 that are to be allocated from among available resources 342 of a group of server devices 340.

As illustrated at reference numeral 304, the defined amounts of resources 306 can be determined. In some embodiments, the defined amounts of resources 306 can be determined based on the type of VM requested by request 302. In some embodiments, the defined amounts of resources 306 can be specified by request 302. The defined amounts of resources 306 can be indicative of resources that are consumed or supplied by VM 106. Examples of the defined amounts of resources can be any of the following or other suitable resources.

A virtual central processing unit vCPU resource 308. For example, vCPU resource 308 can represent a resource that executes VNF 108. A random access memory (RAM) resource 310. RAM resource 310 can store instructions of VNF 108. A memory resource 312 that can, e.g., persistently or in a non-volatile way, store first VM 106 data. An ephemeral storage resource 314. For instance, ephemeral storage resource 314 can temporarily store second VM 106 data that can be tied to a particular instance of VM 106. A network interface connection (NIC) resource 316. NIC resource 316 can indicate a first number of Ethernet network interface connections that are to be supported by VM 106. A sessions resource 318. Sessions resource 318 can indicate a second number of sessions to be supported by VNF 108.

Network device 300 can further determine state data 320 regarding the group of server devices 340, which is illustrated by reference numeral 322. State data can comprise location data 324, resource availability data 326, used capacity data 328, or any other suitable data. Location data 324 can represent locations of various existing VMs that are presently allocated and/or being executed by group of server devices 340. For example, location data 324 can specify and/or identify which server devices 340 are executing existing VMs 106. Resource availability data 326 can indicate available resources 342. It is understood that available resources 342 can represent an accounting of all or a portion of server resources that are unused by all or a portion of each server device 340. Server resources can include all or a portion of those resource types detailed in connection with the defined amounts of resources 306. Used capacity data 328 can represent an amount of resources (e.g., resources 308-318) on a given server device 340 that are allocated to existing VMs 106 being executed at that server device 340. In some embodiments, used capacity data 328 can be determined by subtracting resource availability data 326 for a given server device 340 from maximum amounts of resources supplied by the server device 340.

As noted, state data 320 can represent a current state of group of server devices 340. The group of server devices 340 can represent all or some portion of server devices 102 of cloud platform 100. For example, in some embodiments, the group of server devices 340 can represent a given level of hierarchy of cloud platform 100, for instance, one or more chasses (e.g., common chassis $202_1$-$202_M$), one or more racks, or some other hierarchical unit.

Based on state data 320, network device can perform determination 330. Determination 330 can determine rearrangement data 332. Rearrangement data 332 can be indicative of rearrangement solution 334 (illustrated by determination 336) that transfers execution of an existing virtual machine 106 from a first server device of the group of server device 340 to a second server device of the group. Rearrangement solution 334 can be determined to have a lowest cost among potential rearrangement solution.

In response to determining rearrangement data 332, rearrangement solution 334 can be implemented, as illustrated by reference numeral 338. For example, network device 300 can instruct the second server device to instantiate the existing virtual machine (e.g., the existing virtual machine that is being executed by the first server device). Network device 300 can further instruct the first server device to terminate execution of the existing virtual machine (e.g., freeing up spare capacity on the first virtual machine), and to instantiate the newly requested virtual machine (e.g., satisfying request 302). Additional details are provided in connection with FIGS. 4A-4C, which can be reviewed with FIG. 3 for a more thorough understanding.

Figure 4A:
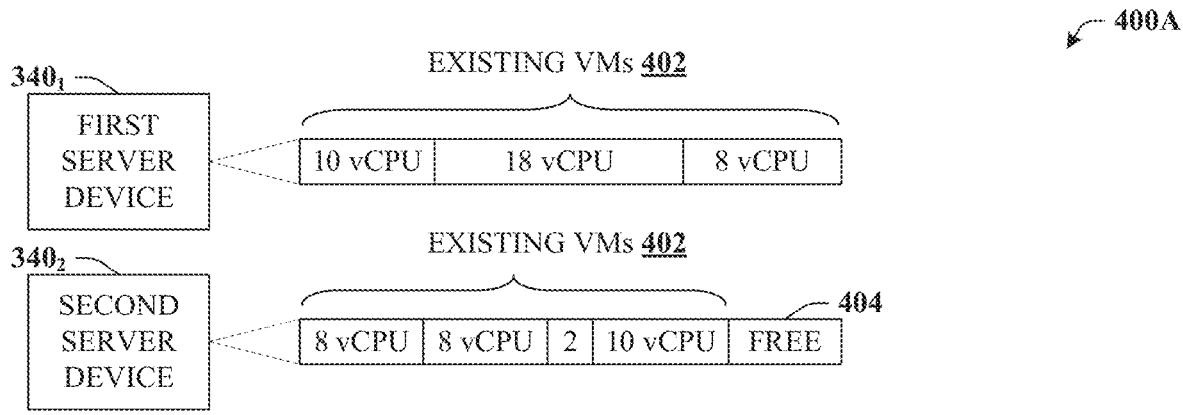
FIG. 4A depicts a block diagram illustrating a first state of two server devices at a first time, $t_1$, in accordance with certain embodiments of this disclosure.

FIG. 4A depicts a block diagram 400A illustrating a first state of two server devices at a first time, $t_1$, in accordance with certain embodiments of this disclosure. Diagram 400A illustrates allocation of vCPU resource 308 of first server device $340_1$ and second server device $340_2$ at the first time. It is understood allocation of resources can allocate multiple resources 308-318, but for the sake of brevity, examples used in the remainder of this disclosure focus on vCPU resource 308 alone, but it is understood that defined amounts of resources 306 allocated to VM 106 can include multiple distinct resource types.

In this example, server devices are assumed to support 36 vCPU. At $t_1$, first server device $340_1$ has three existing VMs 402 that use all 36 units of vCPU resource 308. Second server device $340_2$ has four existing VMs 402 that, in the aggregate consume 28 of the available 36 vCPU, leaving 8 vCPU as spare capacity 404. It is observed that, at $t_1$, utilization of first server device $340_1$ and second server device $340_2$ is efficient, as existing VMs 340 are making good use of server resources.

Figure 4B:
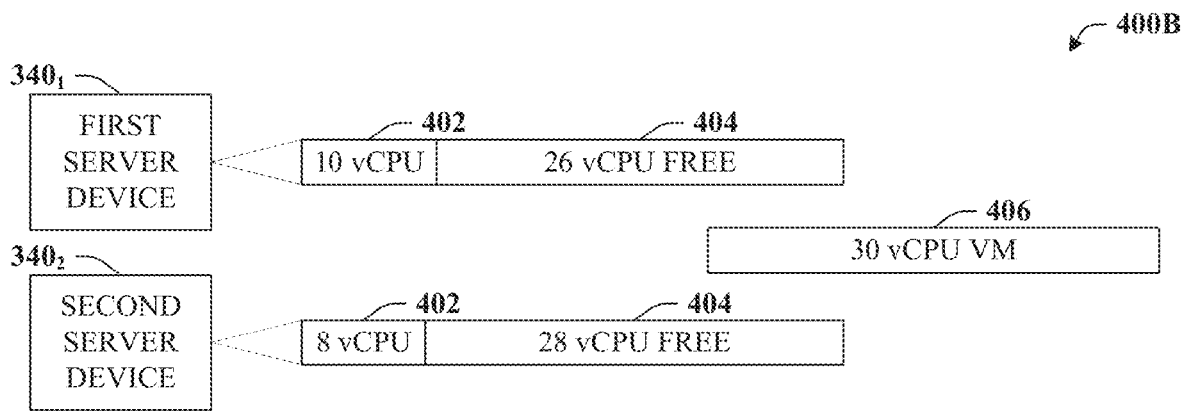
FIG. 4B depicts a block diagram illustrating a second state of two server devices at a second time, $t_2$, in accordance with certain embodiments of this disclosure.

FIG. 4B depicts a block diagram 400B illustrating a second state of two server devices at a second time, $t_2$, in accordance with certain embodiments of this disclosure. Due in part to changing customer demand, at time $t_2$, first server device $340_1$ and second server device $340_2$ each have only one existing VM 402, as others were terminated at some time between $t_1$ and $t_2$. Suppose that at $t_2$, request 302 is received requesting that VM 406 be provisioned. VM 406 is defined to utilize 30 vCPU, which is greater than the 26 vCPU of spare capacity of first server device $340_1$ or the 28 vCPU of spare capacity of second server device $340_2$. Instead of assigning VM 406 to a different server device 340 (e.g., using more server devices), network device 300 can determine rearrangement data 332, e.g., to more efficiently use a smaller set of server devices 340, which is illustrated at FIG. 4C.

Figure 4C:
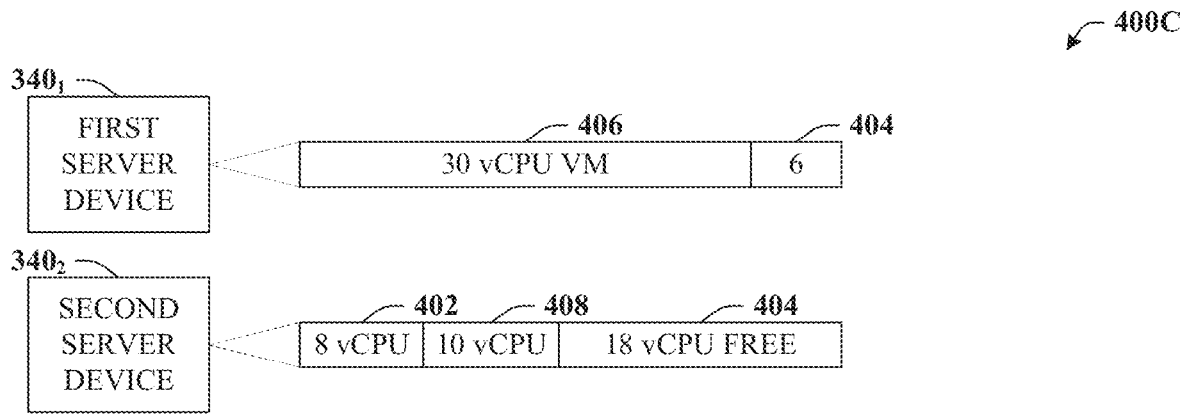
FIG. 4C depicts a block diagram illustrating a third state of two server devices after the rearrangement solution has been implemented, in accordance with certain embodiments of this disclosure.

FIG. 4C depicts a block diagram 400C illustrating a third state of two server devices after the rearrangement solution has been implemented, in accordance with certain embodiments of this disclosure. As illustrated by reference numeral 408, the 10 vCPU VM has been evacuated from first server device $340_1$ and placed on second server device $340_2$, leaving 18 vCPU spare capacity 404. VM 406 can be instantiated at first server device $340_1$, which now has 6 vCPU spare capacity 404.

Still referring to FIGS. 3 and 4A-4C, in some embodiments, determination 330 of rearrangement data 332 can be in response to a determination that resource availability data 342 indicates no individual member of the group of server devices 340 has sufficient available server resources to allocate the defined amounts of resources 306 and instantiate VM 406. In other words, determining that the current state of some group of server devices 340 does not support instantiation of a requested VM 406 can be a trigger to determine rearrangement data 332. Likewise, in some embodiments, rearrangement solution 334 can be determined to result in first server device $340_1$ having sufficient available server resources to allocate the defined amounts of resources 306 and instantiate VM 406 on first server device $340_1$.

Figure 5:
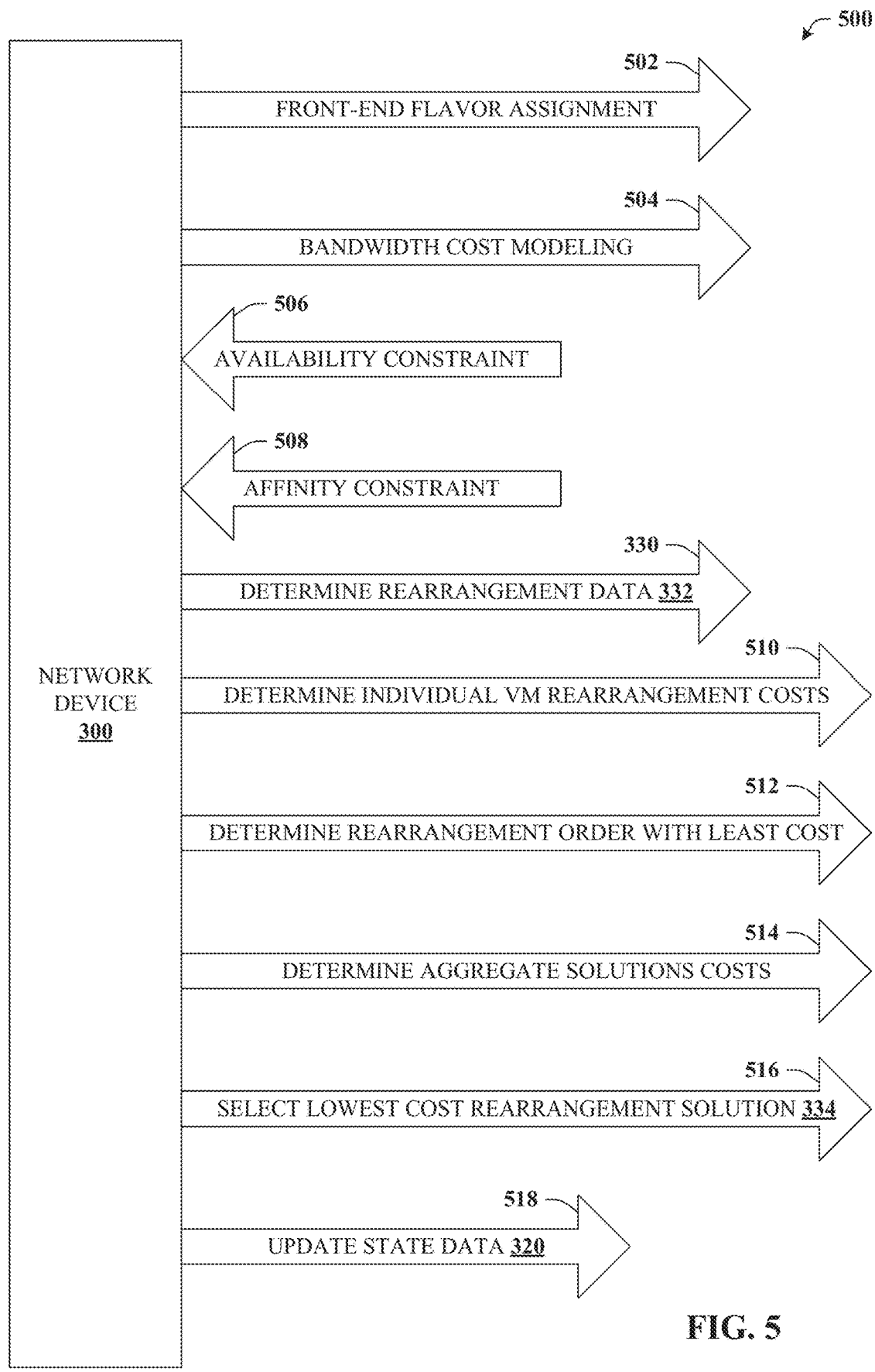
FIG. 5 depicts a block diagram illustrative of additional aspects or elements of the network device in connection with determining a rearrangement solution in accordance with certain embodiments of this disclosure.

Turning now to FIG. 5, a block diagram 500 is illustrated. Diagram 500 illustrates additional aspects or elements of network device 300 in connection with determining a rearrangement solution in accordance with certain embodiments of this disclosure. In this example, it is presumed that determination 330 has been triggered. Determination 330 can be triggered in response to a defined schedule or based on some condition becoming true such as a condition relating to a state of cloud platform 100 or some portion of cloud platform 100. As discussed previously, an example of the condition can be a determination that some group of server devices 340 cannot instantiate a requested virtual machine (e.g., VM 106 or VM 406).

In some embodiments, network device 300 (or some other system or device) can perform front-end flavor assignment 502. Front-end flavor assignment 502 can, in some embodiments, be a procedure that is invoked once or very rarely due to changes in cloud platform 100. In other words, front-end flavor assignment 502 is not expected to be performed frequently or performed each time rearrangement data 332 is determined. Additional detail regarding front-end flavor assignment 502 can be found in connection with FIGS. 6 and 7.

In some embodiments, network device 300 can perform bandwidth cost modeling 504. Bandwidth cost modeling 504 can, e.g., identify bandwidth costs that can be utilized when determining rearrangement data 332. Additional aspects or elements relating to bandwidth cost modeling 504 are provided with reference to FIGS. 8 and 9.

In some embodiments, determination 330 of rearrangement data 332 can be based on availability constraint 506. For example, determination of a lowest cost solution (e.g., rearrangement solution 334) can be determined to satisfy availability constraint 506. Availability constraint 506 can be a requirement or request that an existing virtual machine 402 or a newly requested VM 406 be accessible to a specified geographical zone or topological zone of cloud platform 100.

In some embodiments, determination 330 of rearrangement data 332 can be based on affinity constraint 508. For example, determination of a lowest cost solution (e.g., rearrangement solution 334) can be determined to satisfy affinity constraint 508. Affinity constraint 508 can be a requirement or request that an existing virtual machine 402 or a newly requested VM 406 reside with another existing VM 402 or new VM 406 on a common chassis, a common rack, or some other common hierarchical grouping of server devices 102. As used herein, affinity constraint 508 is intended to include the concept of anti-affinity in which the existing virtual machine 402 or a newly requested VM 406 does not reside with another existing VM 402 or new VM 406 on a common chassis, a common rack, or some other common hierarchical grouping of server devices 102. The concepts of affinity and anti-affinity can satisfy various customer or regulatory as well as provide efficiencies in terms of inter-cloud communication or accessibility in the event some level of hierarchy of cloud platform 100 become unavailable.

In some embodiments, determination 330 of rearrangement data 332 can rely on determination 510 of individual rearrangement costs. Such can reflect the costs (e.g., operations costs) to move an existing VM 402 from one server device 102 to another server device 102, as illustrated by reference numeral 408 of FIG. 4. A given rearrangement solution 334 can rearrange many existing VMs 402, so a total cost of a given rearrangement solution 334 can be an aggregation of the individual rearrangement costs. Non-limiting examples of operations costs can include resources (e.g., CPU, volatile memory, non-volatile memory, bandwidth, etc.) consumed by network device 300 to determine rearrangement data 332, resources utilized within a data center or cloud platform 100 to effectuate rearrangement solution 334, staff hours used to effectuate rearrangement solution 334, energy costs to effectuate rearrangement solution 334, and so forth.

Another type of cost to be considered is unavailability or opportunity costs. For example, suppose a VM 106 is used to execute a gateway VNF 108. Further suppose that VM 106 is rearranged to free up capacity for new demand as detailed herein. If the gateway VNF 108 becomes unavailable to process traffic as a result, then such unavailability can represent a cost. Thus, one objective can be to effectuate rearrangement solution 334 while minimizing unavailability.

In some embodiments, minimizing unavailability and other objectives can be accomplished at least in part by determination 512, which can determine rearrangement order with least or low costs. For instance, in the example provided in connection with reference numeral 408, the existing VM 402 was instantiated on second server device $340_2$ prior to being terminated one first server device $340_1$. Thus, the existing VM 402 need not have any period of unavailability, which would otherwise be the case if the order was reversed. Given that a given VNF 108 can be executed by numerous different VMs 106, rearrangement order can have a significant effect on the cost of rearrangement.

In some embodiments, network device 300 can perform determination 514 that can determine aggregate solutions costs. The aggregate solutions costs can represent the aggregate costs of many potential solutions. Selection 516 can be performed to determine a lowest cost rearrangement solution 334. In some embodiments, state data 320 can be updated to reflect rearrangement solution 334, e.g., after rearrangement solution 334 is implemented on cloud platform 100.

In the context of FIG. 5 and other figures shown herein, various determinations or techniques can be effectuated in the following manner. For example, in order to mathematically formulate a solution to more efficiently utilizing server device resources, we first define several sets.

Let K=the set of VNFs (e.g., VNF 108) we are considering. For example, for cellular network and/or networks providing mobility services, these VNFs can include a gateway VNF (GW), a policy and charging rules function VNF (PCRF), a multi-service proxy VNF (MSP), and a domain name server VNF (DNS). Thus, for example, we might have:

$$K=\{GW, PCRF, MSP, DNS\}.$$

Let I(k)=the set of VMs (e.g., VM 106) for VNF k. Based on a known architecture of an example existing mobility site, there are six gateway VMs (MCM, IOM, WSM, CCM, DCM, ASM) and five PCRF VMs (DEP, DIR, POL, SES, MAN), so, $$I(GW)=\{MCM, IOM, WSM, CCM, DCM, ASM\}$$

$$I(PCRF)=\{DEP, DIR, POL, SES, MAN\}. \quad (1)$$

Let N=the set of possible instances of a VM. For example, if a gateway VNF supports 1 million sessions, and we want to support up to 10 million sessions in a site, we require 10 instances of the gateway VM. We could have N depend on the VNF, e.g., we might need only 5 instances of a PCRF VNF and 10 instances of a gateway VNF, but for simplicity of notation we avoid this extra level of complexity. Based on the VNF characteristics we know that, in a given site, no more than 20 instances of any VNF are likely ever needed, so we set $$N=\{1,2,3,\ldots,20\}.$$

Let B=the set of chasses, where "B" denotes "box". For example, for the example mobility platform we have 6 chasses in each example mobility site, so $$B=\{1,2,3,4,5,6\}.$$

Let J=the set of blades (e.g., server devices 102) in a chassis. For example, for the example mobility platform we have 16 blades per chassis, so $$J=\{1,2,3,\ldots,16\}.$$

Regarding input data, it is observed that certain key capacity indicators (KCI) driving the mobility platform are sessions, bandwidth, memory, and network interface connections, so we specify how much of these resources are supplied or consumed by each VM or VNF.

VNF Session Capacity: For k ∈ K, each instance of VNF k supports S(k) sessions. For the example mobility platform, each gateway (GW) supports 5 million sessions, and each PCRF supports 1 million sessions, so $$S(GW)=5\times10^6$$

$$S(PCRF)=1\times10^6.$$

VM Modularity: For k ∈ K and i ∈ I, each instance of VNF k requires M(k, i) instances of VM i. For example, four IOM VMs are required for each gateway instance, and two MAN VMs are required for each PCRF instance. The data for the example mobility platform is:

$$M(GW;MCM,IOM,WSM,CCM,DCM,ASM)=\{2,4,4,2,4,16\}$$

$$M(PCRF;DEP,DIR,POL,SES,MAN)=\{1,2,4,4,2\}.$$

It is appreciated that the above can be thought of as a shorthand way of writing M(GW, MCM)=2, M(GW, IOM)=4, M(GW, WSM)=4, etc.

Blade Virtual CPU: Each blade supports C virtual CPUs for use by VMs. Currently we have C=36.

VM Virtual CPU: For k ∈ K and i ∈ I, each instance of VM i for VNF k consumes C(k, i) virtual CPUs. For example, the number of vCPUs consumed by each IOM in the GW VNF is C(GW, IOM), and the number of vCPUs consumed by each POL in the PCRF VNF is C(PCRF, POL). The data for the example mobility platform is:

$$C(GW;MCM,IOM,WSM,CCM,DCM,ASM)=\{8,20,20,18,8,18\}$$

$$C(PCRF;DEP,DIR,POL,SES,MAN)=\{8,8,5,6,2\}.$$

Blade Virtual Memory: Each blade supports R gigabytes of RAM memory, where R=128.

VM Virtual Memory: For k ∈ K and i ∈ I, each instance of VM i for VNF k consumes R(k, i) gigabytes of RAM, virtual CPU. For example, the gigabytes consumed by each IOM is R(GW, IOM) and the gigabytes consumed by each POL is R(PCRF, POL). The data for the example mobility platform is:

$$R(GW;MCM,IOM,WSM,CCM,DCM,ASM)=\{32,62,62,56,56,56\}$$

$$R(PCRF;DEP,DIR,POL,SES,MAN)=\{12,16,8,32,6\}.$$

Blade Network Interface Connections: Each blade supports E Ethernet Network Interface Connections (NICs), where E=128.

VM Network Interface Connections: For k ∈ K and i ∈ I, each instance of VM i for VNF k consumes E(k, i) NICs. The data for the example mobility platform is:

$$E(GW;MCM,IOM,WSM,CCM,DCM,ASM)=\{3,7,5,5,5,5\}$$

$$E(PCRF;DEP,DIR,POL,SES,MAN)=\{2,3,1,1,2\}.$$

Regarding variables that can be used, we define VM related variables as follows:

$$x(k, n, i, v, b, j) = \begin{cases} 1 & \text{if instance } v \text{ of VM } i \text{ for instance } n \\ & \text{of VNF } k \text{ is assigned} \\ & \text{to blade } j \text{ of chassis } b \\ 0 & \text{otherwise} \end{cases}$$

We can define VNF related variables as follows:

$$y(k, n,) = \begin{cases} 1 & \text{if instance } n \text{ of VNF } k \text{ is on any set of} \\ & \text{blades and chasses} \\ 0 & \text{otherwise} \end{cases}$$

We can define sessions variables as follows. z=the total number of sessions supported by the site.

Regarding resource related constraints, we can define resources relating to the objective function. The number of instantiated instances of VNF k is $\Sigma_{n \in N}$ y(k, n). Since the number of sessions supported by VNF k is S(k), the number of sessions supported by all the instantiated instances of VNF k is $$S(k) \sum_{n \in N} y(k, n)$$

Assume that the number of blades is fixed, and let z be the maximal number of sessions that can be supported by the given number of blades. The number of sessions supported cannot exceed the number of sessions supported for any VNF, so we have the constraints:

$$z \leq S(k) \sum_{n \in N} y(k, n) \text{ for } k \in K \quad (2)$$

We can define variables relating to the number of instantiated VMs. These constraints can ensure that sufficient VMs are assigned to support each instance of each VNF. For $k \in K$, $I \in I(k)$, and $n \in N$, $$\sum_{n \in N} \sum_{b \in B} \sum_{j \in J} x(k, n, i, v, b, j) \geq y(k, n) \cdot M(k, i). \quad (3)$$

It can be observed that the left hand side of the above constraint is the total number of VMs instantiated for VM type i, where $i \in I(k)$, for VNF k, where the total is over all VNF instances n, blades b, and chasses j. The right hand side is the required number of VMs of type i, where $i \in I(k)$, for VNF k; the right hand side is positive if y(k, n)=1, that is, if instance n of VNF k is instantiated.

We can define variables relating to virtual CPU. These constraints can enforce the virtual CPU constraint for each blade and chassis. For $b \in B$ and $j \in J$, $$\sum_{k \in K} \sum_{n \in N} \sum_{i \in I(k)} \sum_{v \in V} x(k, n, i, v, b, j) \cdot C(k, i) \leq C. \quad (4)$$

Variables relating to Memory: These constraints can enforce the memory constraint for each blade and chassis. For $b \in B$ and $j \in J$, $$\sum_{k \in K} \sum_{n \in N} \sum_{i \in I(k)} \sum_{v \in V} x(k, n, i, v, b, j) \cdot R(k, i) \leq R. \quad (5)$$

Variables relating to NIC: These constraints can enforce the network interface connections constraint for each blade and chassis. For $b \in B$ and $j \in J$, $$\sum_{k \in K} \sum_{n \in N} \sum_{i \in I(k)} \sum_{v \in V} x(k, n, i, v, b, j) \cdot E(k, i) \leq E. \quad (6)$$

As has been demonstrated previously, rearrangement of VMs to different blades can increase blade utilization and/or reduce the number of blades in a set that can accommodate a given number of VMs. As also noted, there is an operational cost to rearrangements, which can be modeled by a cost, α, per rearrangement of a VM. In some embodiments, this cost a can be representative of individual rearrangement costs indicated by determination 510. To model rearrangement, define:

$$\bar{x}(k, n, i, v, b, j) = \begin{cases} 1 & \text{if instance } v \text{ of VM } i \text{ for instance } n \\ & \text{of VNF } k \text{ is CURRENTLY} \\ & \text{assigned to blade } j \text{ of chassis } b \\ 0 & \text{otherwise} \end{cases}$$

A rearrangement cost can be incurred if we assign any instance of any VM of any VNF to a new blade either in the same chassis or in a different chassis. By defining $$p(k,n,i,v,b,j) = |x(k,n,i,v,b,j) - \bar{x}(k,n,i,v,b,j)|$$

$$p(k,n,i,v,b,j) = p^{pos}(k,n,i,v,b,j) - p^{neg}(k,n,i,v,b,j)$$

$$p^{pos}(k,n,i,v,b,j) \geq 0$$

$$p^{neg}(k,n,i,v,b,j) \geq 0$$

The total costs of all the rearrangements is given by P, where $$P = \alpha \sum_{k \in K} \sum_{n \in N} \sum_{i \in I} \sum_{v \in V} \sum_{b \in B} \sum_{j \in J} [p^{pos}(k, n, i, v, b, j) + p^{neg}(k, n, i, v, b, j)] \quad (7)$$

For example, FIG. 15 illustrates a block diagram 1500, depicting a more comprehensive example of rearrangements in which ten VMs are instantiated on five hosts. For example, block diagram 1500 illustrates a slightly more comprehensive example than that provided in connection with FIGS. 4A-4C. Once more, this example only considers vCPU, which in practice tends to be the bottleneck resource. Consider five VMs (call them VM 1 through 5), which have vCPU requirements (8 10 18 18 20), so VM1 requires 8 vCPUs, VM2 requires 10 vCPUs, etc. Each host (e.g., server device 102) has a capacity of 36 vCPUs. Suppose these five VMs are instantiated on five hosts, where VM1 is assigned to host 1, VM2 is assigned to host 2, etc. Now suppose we want to instantiate five more VMs (call them VMs 6 through 10) which have vCPU requirements (16 30 16 36 6). A question arises: can we instantiate these new VMs onto the existing set of hosts or will a new blade, possibly on a different chassis, be required? Using the model detailed above, and solving the optimization problem using, e.g., an AMPL modeling language combined with, e.g., a general purpose CPLEX solver, the code output is given at FIG. 15. The squares with horizontal lines show the reassignments: VM2 was reassigned from host 2 to host 1, and VM3 was reassigned from host 3 to host 4. With these reassignments, the new VMs 5 through 10 can now fit on the existing hosts, as shown by the squares having vertical lines: VM6 goes on host 1, VM7 goes on host 2, VM8 goes on host 5, VM9 goes on host 3, and VM10 goes on host 2.

The disclosed formulations allow for any number of affinity constraints (e.g., affinity constraint 508), which can specify, e.g., that certain VMs must go on the same blade or anti-affinity constraints, which can specify, e.g., that certain VMs cannot go on the same blade.

In the example mobility platform, the gateway MCM VMs must reside on different blades, which is modeled as follows: For b ∈ B and j ∈ J, $$\sum_{n \in N} \sum_{v \in V} x(GW, n, MCM, v, b, j) \le 1 \qquad (8)$$

These constraints can mean that for each blade b and chassis j, the sum, e.g., over all instances of the gateway VNF and all instances of the MCM VM, of the number of GW MCMs assigned cannot exceed 1.

Another anti-affinity constraint can be that an ASM cannot share a blade with any other gateway VM. To express this constraint, define I(GW)-ASM to be the set I(GW)-{ASM}, which can be the set of all gateway VMS other than the ASM. For b ∈ B and j ∈ J, $$\sum_{n \in N} \sum_{i \in I(GW)-ASM} \sum_{v \in V} [x(GW, n, i, v, b, j) + x(GW, n, ASM, v, b, j)] \le 1 \qquad (9)$$

Another anti-affinity constraint says that an ASM cannot share a blade with any other PCRF VM. For b ∈ B and j ∈ J, $$\sum_{n \in N} \sum_{i \in I(PCRF)} \sum_{v \in V} [x(PCRF, n, i, v, b, j) + x(GW, n, ASM, v, b, j)] \le 1 \qquad (10)$$

Another anti-affinity constraint indicates that WSM and IOM VMs cannot go on the same blade: For b ∈ B, j ∈ J, n ∈ N, and v ∈ V, $$x(GW,n,WSM,v,b,j)+x(GW,n,IOM,v,b,j) \le 1 \qquad (11)$$

Still another anti-affinity rule is that WSM and ASM VMs cannot go on the same blade: For b ∈ B, j ∈ J, n ∈ N, and v ∈ V, $$x(GW,n,WSM,v,b,j)+x(GW,n,ASM,v,b,j) \le 1 \qquad (12)$$

Example Systems for Front-End Flavor Assignment

Figure 6:
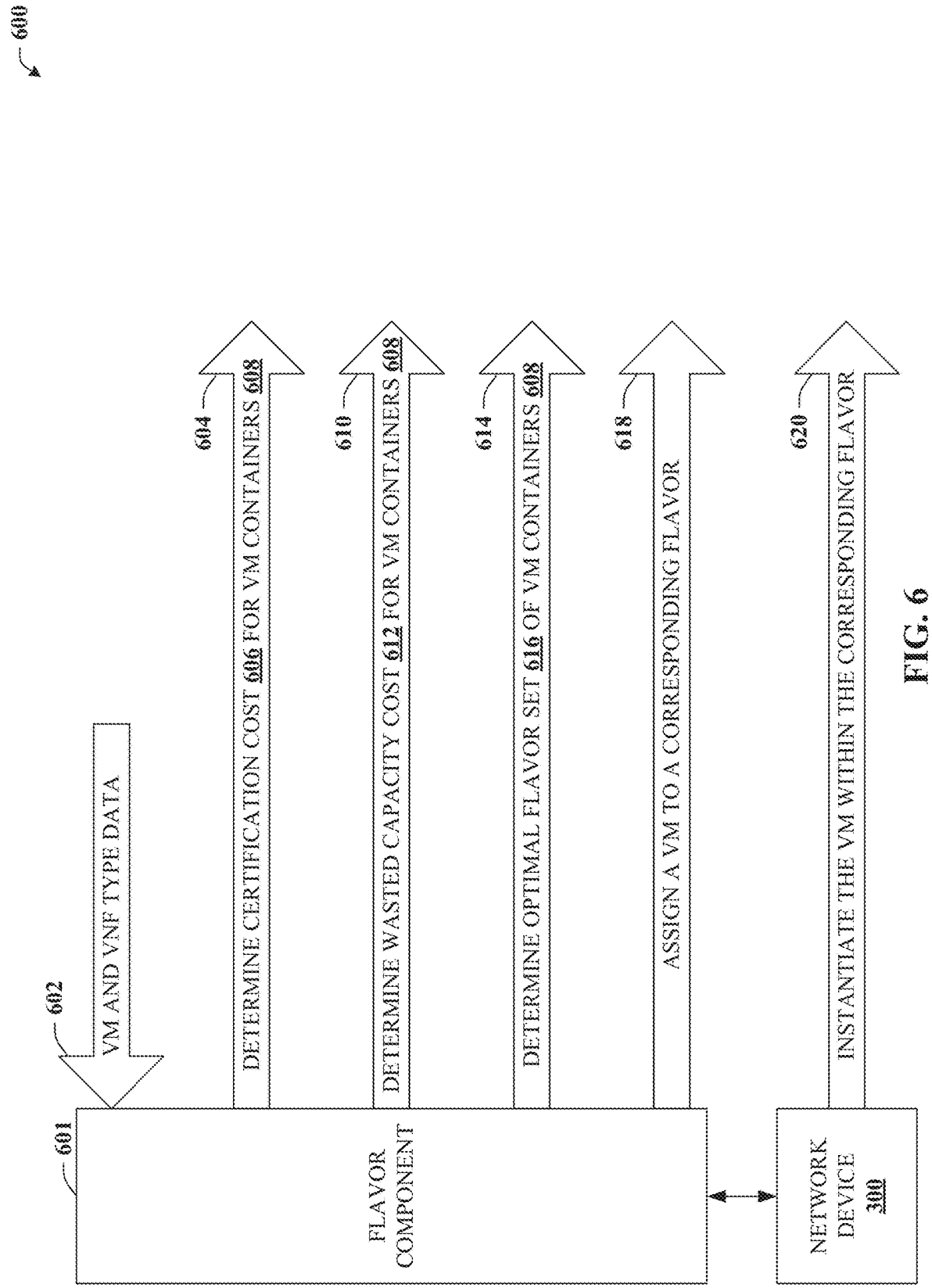
FIG. 6 depicts a block diagram of an example system that can determine front-end flavor assignments in accordance with certain embodiments of this disclosure.

Referring again to the drawings, with reference now to FIG. 6, a block diagram of an example system 600 is illustrated. System 600 can determine front-end flavor assignments in accordance with certain embodiments of this disclosure. System 600 can include flavor component 601, which can be included in or operatively coupled to network device 300. In some embodiments, flavor component 601 can perform all or a portion of front-end flavor assignment 502.

Certain other techniques or solutions detailed herein can, in some embodiments, rely on the assumption that the set of VNFs 108 and the set of VMs 106 are known a priori. One issue that arises in cloud platforms is that due to changes in technology, market factors, or other changes, the sets of VNFs 108 or VMs 106 might change. Such changes can incur significant costs in terms of, e.g., certification and testing. For example, a cloud service provider or vendor of server devices 102 or other elements of cloud platform 100 may need to extensively test and certify that VMs and VNFs having defined specifications function as intended before those VMs or VNFs are actually implemented. As noted, such testing and certification can represent significant costs both in terms of resources and time.

In an effort to mitigate testing and certification costs, rather than plugging directly into a server device, a VM can be instantiated within a container, which plugs into the server device. This container can be referred to as a flavor, and different flavors can represent containers with different characteristics. The "dimensions" of a flavor can be specified in terms of allocation of resources, so a flavor can contain one or more VMs that can "fit" inside the flavor, again, in terms of resource capacity, demand, or requirements. A potential efficiency that can be realized in connection with flavors (e.g., containers) is that testing and certification can be performed on the flavors instead of the VM's. Since the number of flavors selected can be significantly less than the number of VMs, testing and certification costs can be reduced. For example, if the specification for a VM or VNF changes or a new VM or VNF is proposed, the new or updated VM or VNF can forego testing and certification rigors by being placed within a container that was already tested and certified.

In some embodiments, flavor component 601 can receive type data 602, which can represent types or characteristics of VMs 106, VNFs 108, or other constructs that are employed in connection with cloud platform 100. In some embodiments, flavor component 601 can perform determination 604, which can determine certification costs 606 for VM containers 608. VM containers 608 can be referred to as flavors 608.

In some embodiments, flavor component 601 can perform determination 610. Determination 610 can determine wasted capacity cost 612 for VM containers 608. This wasted capacity cost 612 can be representative of the cost of unused resources allocated to the container, which is further detailed in connection with FIG. 7. In some embodiments, flavor component 601 can perform determination 604. Determination 614 can determine optimal flavor set 616 of VM containers 608. In other words, determining which flavors and/or characteristics of a give VM container 608 should be selected.

In some embodiments, flavor component 601 can perform assignment 618. Assignment 618 can assign a VM to a corresponding flavor. Once a given VM has been assigned to a particular flavor, network device 300 can instantiate or instruct server devices 340 to instantiate that VM within the corresponding flavor (e.g., VM container 608), which is illustrated at reference numeral 620.

Figure 7:
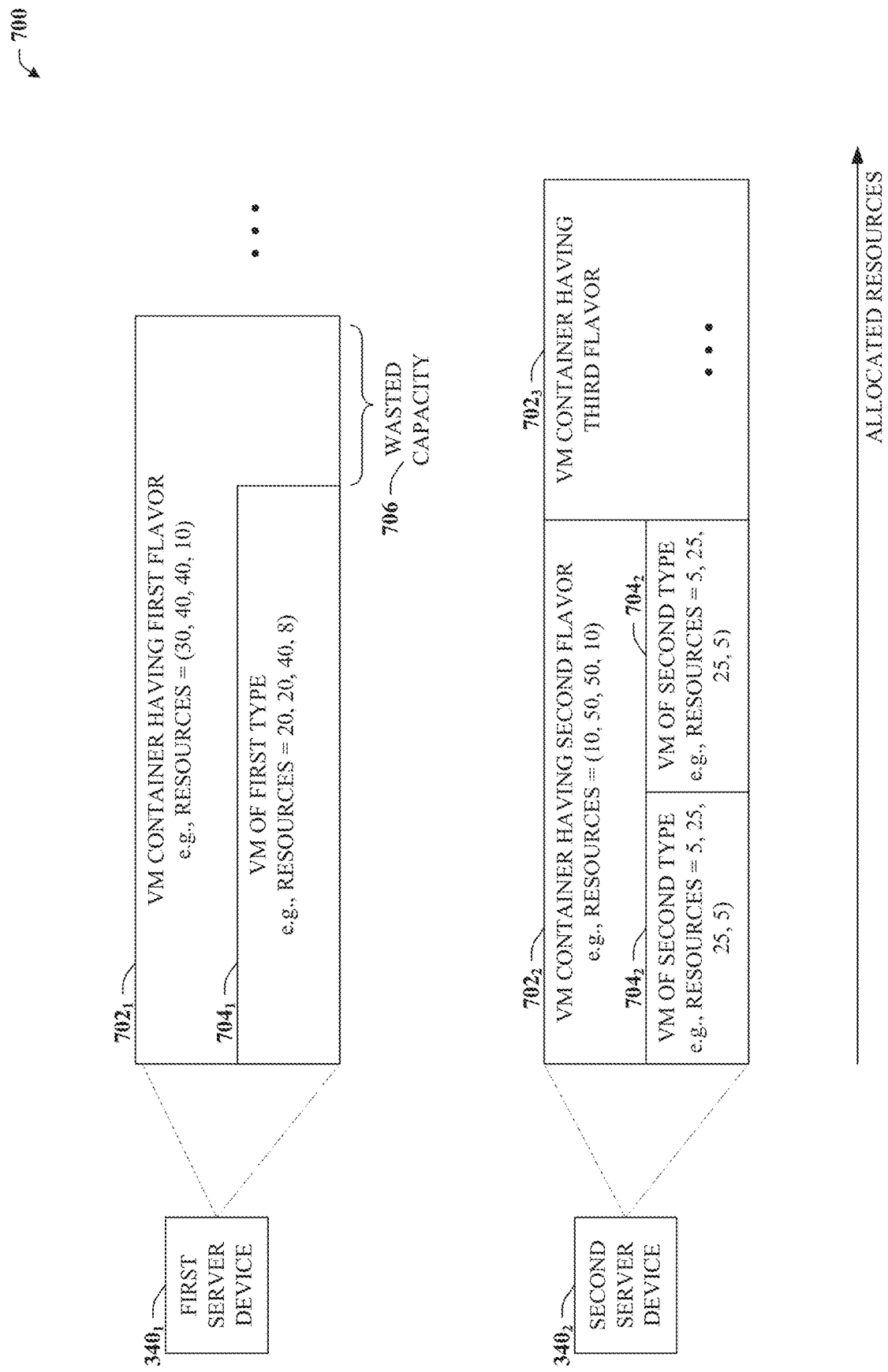
FIG. 7 is a block diagram illustrating additional aspects or elements in connection with determining front-end flavor assignments in accordance with certain embodiments of this disclosure.

While still referring to FIG. 6, but turning now as well to FIG. 7, a block diagram 700 is illustrated. Diagram 700 can provide for additional aspects or elements in connection with determining front-end flavor assignments in accordance with certain embodiments of this disclosure. In some embodiments, front-end flavor assignment 502 and/or elements of FIG. 6 can be modeled as a two-stage optimization problem. The first stage can assign each VM to be considered to a flavor (e.g., assignment 618), with the objective function of minimizing the sum of two costs. A first cost can be the cost 606 of testing and certifying the flavors.

A second cost can be the total penalty for all wasted capacity (e.g., wasted capacity cost 612). Diagram 700 illustrates flavor $702_1$, being plugged into first server device $340_1$ and VM $704_1$ being plugged into flavor $702_1$. Since VM $704_1$ does not utilize all the resources of flavor $702_1$, there is wasted capacity 706, which can be translated into a discrete cost. Two other flavors, $702_2$ and $702_3$, having different characteristics (e.g., resource allocations), are shown plugged into second server device $340_2$. Flavor $702_2$ contains multiple VMs $704_2$ of a given type. As illustrated, a server device 340 can contain multiple flavors 702 and each flavor can contain one or more VM 704.

In some embodiments, the first stage can be solved by a very fast dual ascent heuristic. The second stage then takes this set of flavors (e.g., optimal flavor set 616) and determines the minimal or a reduced number of blades/hosts required to satisfy the demand of VMs to blades/hosts. The second stage can be solved by formulating a novel optimization problem which combines the conflicting objectives detailed herein and the constraints detailed herein.

For example, as detailed previously, each VM 340 can be characterized by a set of resource requirements for, e.g., vCPU, memory, NIC, etc. These resource requirements for a VM can be determined during the front-end flavor assignment 502, which can map each VM flavor requirement to a particular flavor (e.g., assignment 618). The VM flavor requirement for a VM 340 can be an ordered tuple of resource requirements.

(vCPU, RAM, memory, ephemeral disk)

As noted, a flavor can be a logical container for a VM. Each VM does not directly plug into a blade/host, but rather is assigned to a container, known as a flavor, which plugs into the host. A flavor can also be characterized by an ordered tuple, (vCPU, RAM, memory, ephemeral disk) of resource requirements or allocation. It is appreciated that both the VM and the flavor can use the same ordered tuple, which can be members of resources 306. In this example, the ordered tuple utilizes the vCPU resource 308, the RAM resource 310, the memory resource 312, and the ephemeral storage resource 314. Since it can be expensive to test and certify flavors, it can be desirable to test and certify only a small number of flavors.

Let F=the set of flavors. Let R be the set of resources. In this example, we have:

$R=\{vCPU, RAM, memory, ephemeral disk\}$

The maximum number of flavors to consider is the maximum number of distinct 4-tuples of resources (vCPU, RAM, memory, ephemeral disk) among all the VMs. The flavor assigned to a VM generally must, for each of these resources, be rated (e.g., be able to handle) at a value not less than the VM flavor requirement for that VM. For example, if for some VM the flavor requirement is (20, 20, 40, 8) (e.g., VM $704_1$) then we can map this requirement to the flavor (30, 40, 40, 10) (e.g., flavor $702_1$) but not to the flavor (10, 50, 50, 10) (e.g., flavor $702_2$), since 10 vCPU<20 vCPU.

For $i \in I(k)$ and $k \in K$, Let $N_i$ be the total number of instances of VM type i required, where there the total is over all instances of all VNFs that utilize VM type i. For example, suppose each instance of VNF1 requires 4 instances of VM1, and each instance of VNF2 requires 7 instances of VM1. Then if we provision two instances of VNF1 and three instances of VNF2, then for this VM we have $N_i=(2)(4)+(3)(7)$.

Let I be the set of all VM types (over all VNFs). Thus, $$I = \bigcup_{k \in K} I(k)$$

For $i \in I$ and $r \in R$, let $d_{ir}$ be the demand for resource r for VM type i, e.g., $d_{(DSM, vCPU)}=12$. Thus, $d_{ir}$ is the value in the VM flavor requirement corresponding to this resource.

For flavor type $f \in F$ and $r \in R$, let $s_{fr}$ be the supply of resource r for flavor type f, e.g., $s_{(flavor1, vCPU)}=20$.

Define the decision variable p(i, f) by:

$$p(i, f) = \begin{cases} 1 & \text{if } VM \text{ flavor requirement } i \text{ is assigned to flavor } f \\ 0 & \text{otherwise} \end{cases}$$

The letter p is used here as a pneumonic for "package type". Also define the variable q(f) by:

$$q(f) = \begin{cases} 1 & \text{if flavor } f \text{ is used by any } VM \text{ flavor requirement} \\ 0 & \text{otherwise} \end{cases}$$

The first constraint says that each VM flavor requirement must be assigned to exactly one flavor, so we require:

$$\sum_f p(i, f) = 1 \text{ for each } i \quad (13)$$

The second constraint says that we can only assign a VM flavor requirement to a flavor if the flavor is used, so $p(i, f) \leq q(f)$ for each i and f.

Let $c_f$ be the per certified flavor (e.g., the cost of testing, certifying, etc.). The first term in the objective function is $c_f \sum_f q(f)$, which is the total cost of using the chosen flavors.

The second term in the objective function considers wasted capacity: the "cost" of assigning VM flavor requirement i to flavor f is infinite if flavor f does not have sufficient capacity. Otherwise, the cost is the wasted capacity resulting from assigning VM i to a flavor that is larger than needed. Thus $$waste_{i,f} = \begin{cases} \infty & \text{if } s_{fr} < d_{ir} \text{ for some resource } r \\ \sum_{r \in R} (s_{fr} - d_{ir}) & \text{otherwise} \end{cases}$$

We could alternatively define:

$$waste_{i,f} = \begin{cases} \infty & \text{if } s_{fr} < d_{ir} \text{ for some resource } k \\ \max_{r \in R} \{s_{fr} - d_{ir}\} & \text{otherwise} \end{cases}$$

The objective function F of the preprocessing step can be the sum of the two above costs:

$$F = c_f \sum_{f \in F} q(f) + \sum_{i \in I} \left( N_i \sum_{f \in F} waste_{i,f} \, p(i, f) \right)$$

The objective function can be employed to minimize the total flavor cost F, subject to the constraints (13). Once a flavor has been assigned to each VM flavor requirement, the front end optimization can be complete. We now have the VM resource requirements for each VM, and the VM resource requirements are the input to certain optimizations of sections of this document.

Example Systems for Bandwidth Cost Modeling

Figure 8:
FIG. 8 depicts a block diagram of an example system that can determine a bandwidth cost associated with backplane communication in accordance with certain embodiments of this disclosure.

Still referring to the drawings, with reference now to FIG. 8, a block diagram of an example system 800 is illustrated. System 800 can determine a bandwidth cost associated with backplane communication in accordance with certain embodiments of this disclosure. As illustrated, elements detailed in this section can be performed by network device 300. However, it is understood that other components, elements or devices might be used to accomplish the disclosed techniques, which can be included in network device 300 or operatively coupled to network device 300.

In some embodiments, network device 300 can perform determination 802. Determination 802 can determine a level of hierarchy that is to be considered. The level of hierarchy can in turn determine the set of server devices 340 that are to be considered. For example, a level of hierarchy can relate to one or more chasses, racks, nodes, etc. detailed in connection with FIG. 2, which can include a specified group of server devices 340.

In some embodiments, network device 300 can perform mapping 804. Mapping 804 can map server devices of the level to groups. For example, the group of server devices 340 can be mapped to two equal groups $J_1$ and $J_2$. The respective server devices 340 assigned to a given group, J, can be determined based on architecture, for instance, server devices 340 on a common chassis (or other hierarchical unit) can be assigned to the same group. In some embodiments, the groups can include subgroups based on backplane structure or the like, which is further detailed in connection with FIGS. 9A and 9B.

In some embodiments, network device 300 can perform determination 806. Determination 806 can determine bandwidth costs, e.g., for a given state of the server devices or for a given rearrangement solution 334.

Figure 9A:
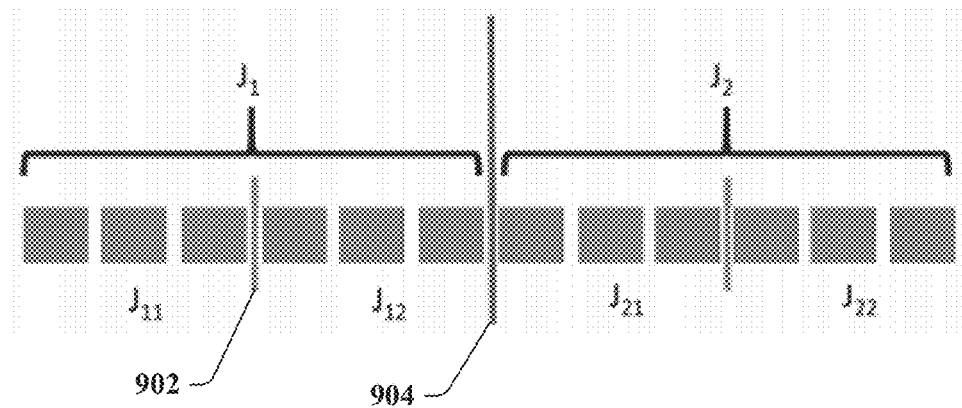
FIG. 9A illustrates a block diagram depicting a logical representation of a hierarchy grouping in accordance with certain embodiments of this disclosure.
Figure 9B:
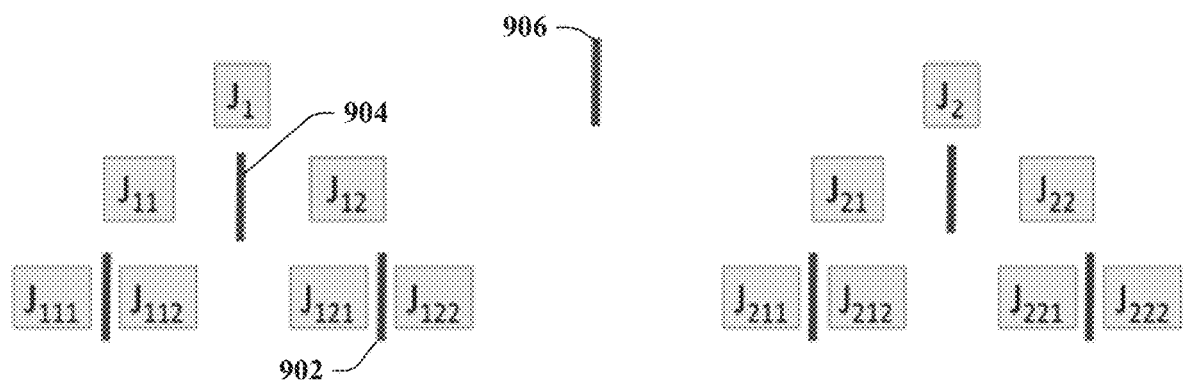
FIG. 9B illustrates a block diagram depicting a hierarchy tree in connection with the grouping in accordance with certain embodiments of this disclosure.

While still referring to FIG. 8, but turning as well to FIGS. 9A and 9B, diagrams 900A and 900B are depicted. Diagram 900A illustrates a logical representation of a hierarchy grouping in accordance with certain embodiments of this disclosure. Diagram 900B illustrates a hierarchy tree in connection with the grouping in accordance with certain embodiments of this disclosure.

Lines 902, 904, and 906 can represent communication backplanes, and are referred to herein as "cuts". For example, cut 902 can represent a common chassis backplane 204, cut 904 can represent a common rack backplane 206 and cut 906 can represent a communication backplane of a higher or different level of hierarchy such as node backplane 208.

When VMs for the same VNF are placed on different blades, or on different chasses, then these VMs typically must have channels over which they can communicate. All such communication consumes communication resources (e.g., bandwidth) of the cloud platform 100 switching fabric. The cost of a channel depends on the amount of bandwidth needed. We model these costs for a multi-level equipment hierarchy: multiple blades sit in a given chassis, multiple chasses sit in a given rack, etc. At a given level of the hierarchy (for example, a given chassis), partition the set of blades/hosts/servers into equal size sets $J_1$ and $J_2$. Let V (k) be the total number of VMs (e.g., summed over all VM types and instances of each type) needed for each instance of VNF k. For example, suppose for each instance of the DNS (Domain Name Server) VNF we need three VM_A and four VM_B. Then V (DNS)=7. For each k and n, and for a given chassis b define integer variables $y_1(k, n, b)$ and $y_2(k, n, b)$, and binary variables $z_1(k, n, b)$ and $z_2(k, n, b)$:

$$y_1(k, n, b) = \sum_{j \in J_1} \sum_i \sum_v x(k, n, i, v, b, j)$$

$$z_1(k, n, b) = \lceil y_1(k, n, b) / V(k) \rceil$$

$$y_2(k, n, b) = \sum_{j \in J_2} \sum_i \sum_v x(k, n, i, v, b, j)$$

$$z_2(k, n, b) = \lceil y_2(k, n, b) / V(k) \rceil$$

Thus $y_1(k, n, b)$ is the total number of VMs for instance n of VNF k that use any blade in $J_1$ on chassis b. And $z_1(k, n, b)=1$ if $y_1(k, n)>0$, and $z_1(k, n, b)=0$ otherwise. Similarly, for $y_2(k, n, b)$ and $z_2(k, n, b)$.

We incur a penalty c(k, n) if $z_1(k, n, b)+z_2(k, n, b)=2$ (that is, if we use VMs in both $J_1$ and $J_2$ so that we cross a logical "cut" between the sets $J_1$ and $J_2$), but no penalty if $z_1(k, n, b)+z_2(k, n, b)=1$. Note that the penalty is c(k, n) and not c(k, n, b); that is, the penalty is independent of the chassis b.

$$\text{cost}(k,n,b) = c(k,n)[z_1(k,n,b)+z_2(k,n,b)-1] \tag{14}$$

$$V(k)z_1(k,n,b) \geq y_1(k,n,b) \tag{15}$$

$$V(k)z_2(k,n,b) \geq y_2(k,n,b) \tag{16}$$

From (14) we have cost(k, n, b)=0 if $z_1(k, n, b)+z_2(k, n, b)=1$ and cost(k, n, b)=c(k, n) if $z_1(k, n, b)+z_2(k, n, b)=2$. Note that we cannot have cost(k, n, b)<0, since $z_1(k, n, b)+z_2(k, n, b)$ is either 1 or 2. A problem can arise in defining c(k, n). For example, suppose that, for some k and n, all VMs have been assigned to $J_1$ except for one VM which is assigned to $J_2$. If that one VM requires only 1 virtual CPU, then it will be advantageous for c(k, n) to be small, since the bandwidth crossing the cut is small. On the other hand, if high bandwidth VMs are assigned to both $J_1$ and $J_2$ then we want c(k, n) to be high, since the bandwidth crossing the cut is high.

One quick and easy approach is to let c(k, n) correspond to the largest bandwidth of any VM used for VNF k. A more refined approach, but which requires many more variables, is to do the following for each instance n of each VNF k on chassis b.

Instead of just $y_1(k, n, b)$ and $y_2(k, n, b)$, for each VM type i define integer variables $y_{1i}(k, n, b)$ and $y_{2i}(k, n, b)$, and binary variables $z_{1i}(k, n, b)$ and $z_{2i}(k, n, b)$:

$$y_{1i}(k, n, b) = \sum_{j \in J_1} \sum_{v} x(k, n, i, v, b, j)$$

$$z_{1i}(k, n, b) = \lceil y_{1i}(k, n, b)/V(k) \rceil$$

$$y_{2i}(k, n, b) = \sum_{j \in J_2} \sum_{v} x(k, n, i, v, b, j)$$

$$z_{2i}(k, n, b) = \lceil y_{2i}(k, n, b)/V(k) \rceil$$

So $y_{1i}(k, n, b)$ is the total number of VMs of type i for instance n of VNF k that use any blade in $J_1$. And $z_{1i}(k, n, b)=1$ if $y_{1i}(k, n, b)>0$, and $z_{1i}(k, n, b)=0$ otherwise. Similarly, for $y_{2i}(k, n, b)$ and $z_{2i}(k, n, b)$. If $z_{1i}(k, n, b)+z_{2i}(k, n, b)=2$ we incur a penalty. Let $w(k, i)$ be the bandwidth of VM type i for VNF k. To figure out the penalty, suppose the capacity of the backplane is 10, and there are 3 VMs of type i in $J_1$ and 5 VMs of type i in $J_2$. Then the bandwidth crossing the cut is $3 \cdot w(k, i)$. In general, the penalty is $\min\{y_{1i}(k, n, b), y_{2i}(k, n, b)\} \cdot w(k, i)$.

The above paragraph is for a single VM type i. To determine for all VM types associated with a given VNF, we compute for each VM type I associated with VNF k:

$$\min\{y_{1i}(k,n,b), y_{2i}(k,n,b)\} \cdot w(k,i)$$

We can represent $\min\{y_{1i}(k, n, b), y_{2i}(k, n, b)\}$ using an additional variable $y_i^M$, where $y_i^M \leq y_{1i}(k, n, b)$ and $y_i^M \leq y_{2i}(k, n, b)$.

The bandwidth crossing the cut is the maximum (e.g., over all VM types i associated with VNF k) of all these terms. Recalling that I(k) is the set of VMs types associated with VNF k, the bandwidth penalty cost on chassis b for instance n VNF k is then:

$$\text{cost}(J_1, J_2, k, n, b) \equiv \max_{i \in I(K)} \{\min\{y_{1i}(k, n, b), y_{2i}(k, n, b)\} \cdot b(k, i)\}$$

Then $$\text{cost}(J_1, J_2) \equiv \sum_{k,n,b} \text{cost}(J_1, J_2, k, n, b)$$

The above identity can be where the sum over all instances n of VNFs k and all chasses b. All this is across a single cut partitioning a set of blades into sets $J_1$ and $J_2$. For the more general scenario illustrated in FIG. 9A, the total bandwidth penalty cost, denoted by cost, is given by $$\text{cost}=\text{cost}(J_1,J_2)+\text{cost}(J_{11},J_{12})+\text{cost}(J_{21},J_{22})$$

For the even more general multi-level hierarchy illustrated in FIG. 9B, we have $$\text{cost} = \text{cost}(J_1, J_2)$$
$$+ \text{cost}(J_{11}, J_{12}) + \text{cost}(J_{21}, J_{22})$$
$$+ \text{cost}(J_{111}, J_{112}) + \text{cost}(J_{121}, J_{122}) + \text{cost}(J_{211}, J_{212}) + \text{cost}(J_{221}, J_{222})$$

Example Methods

Figure 10:
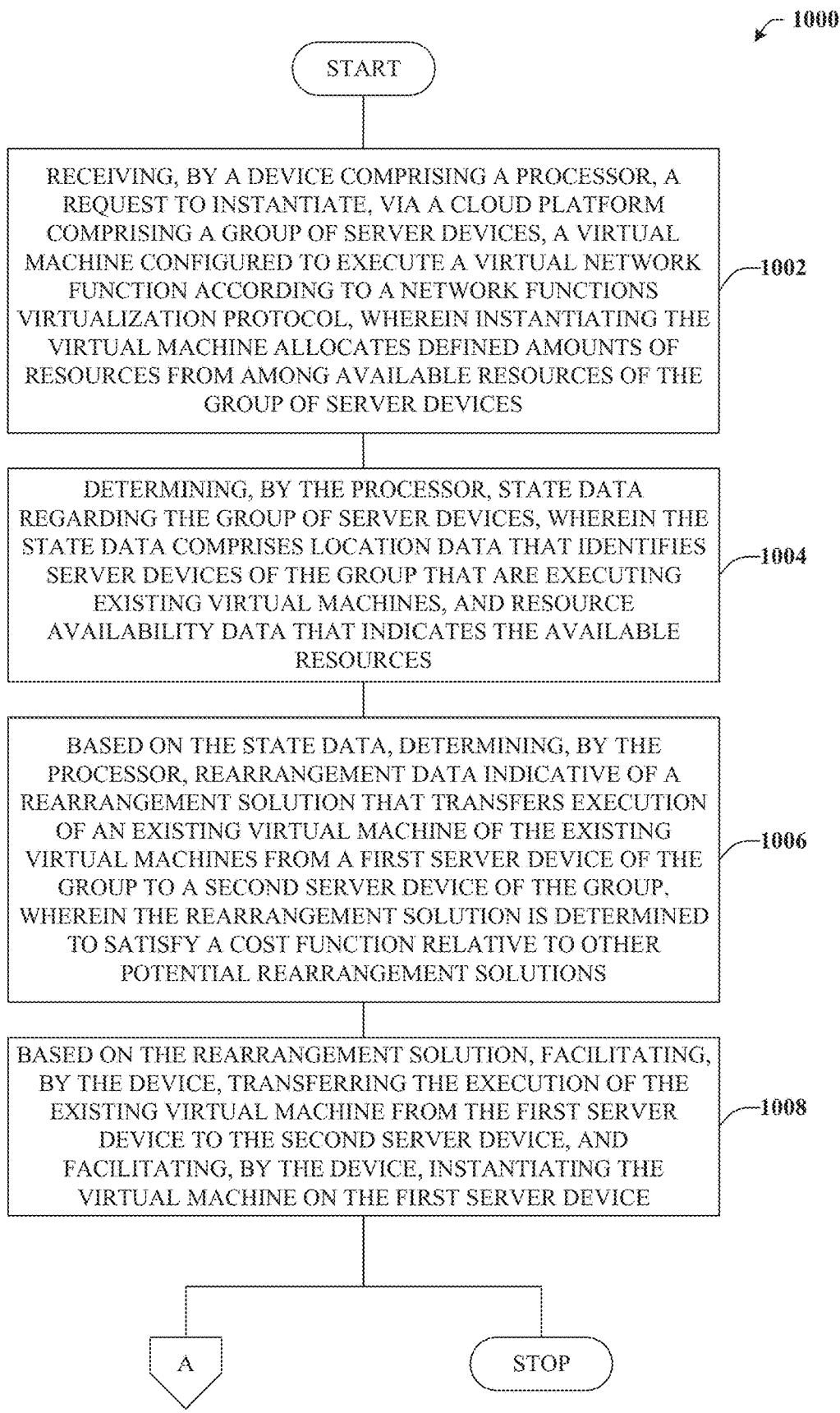
FIG. 10 illustrates an example methodology that can determine a rearrangement solution that rearranges existing VMs in accordance with certain embodiments of this disclosure.
Figure 11:
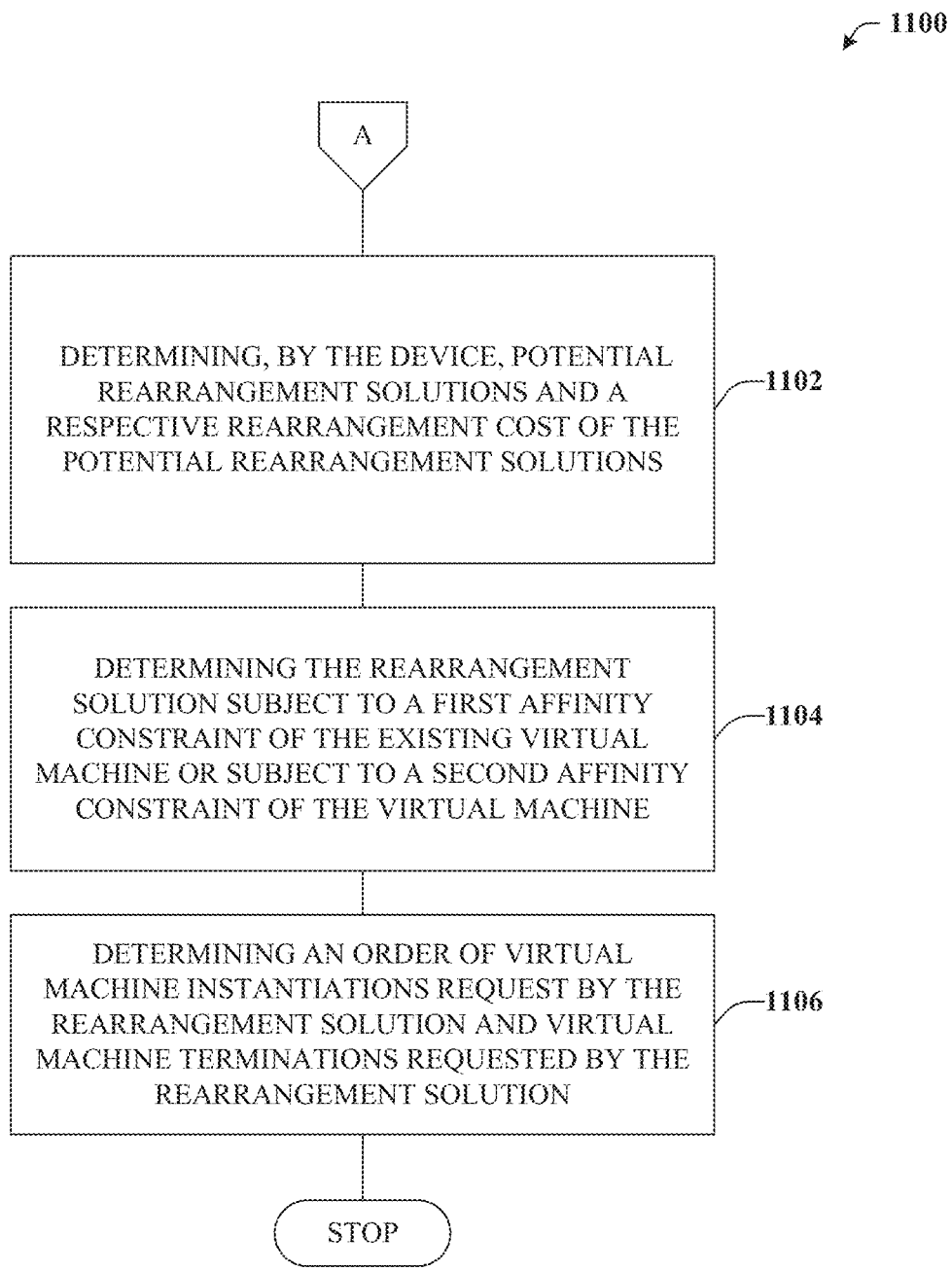
FIG. 11 illustrates an example methodology that can provide for additional elements or aspects in connection with determining the rearrangement solution that rearranges existing VMs in accordance with certain embodiments of this disclosure.

FIGS. 10 and 11 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 10, exemplary method 1000 is depicted. Method 1000 can determine a rearrangement solution that rearranges existing VMs in accordance with certain embodiments of this disclosure. For example, at reference numeral 1002, a device comprising a processor can receive a request to instantiate, via a cloud platform comprising a group of server devices, a virtual machine. The virtual machine can be configured to execute a virtual network function according to a network functions virtualization protocol. The instantiating the virtual machine can allocate defined amounts of resources from among available resources of the group of server devices.

At reference numeral 1004, the device can state data regarding the group of server devices. The state data can comprise location data, resource availability data, or other suitable data such as, e.g., used capacity data. The location data can identify server devices of the group that are executing existing virtual machines. The resource availability data can indicate the available resources for all or a portion of the server devices of the group.

At reference numeral 1006, the device can, based on the state data, determine rearrangement data. The rearrangement data can be indicative of a rearrangement solution that transfers execution of an existing virtual machine from a first server device of the group to a second server device of the group. The rearrangement solution can be determined to satisfy a cost function relative to other potential rearrangement solutions.

At reference numeral 1008, the device can facilitate implementation of the rearrangement solution. For example, based on the rearrangement solution determined at reference numeral 1006, the device can facilitate transferring the execution of the existing virtual machine from the first server device to the second server device. In addition, the device can facilitate instantiating the virtual machine on the first server device. Method 1000 can proceed to insert A, which is further detailed in connection with FIG. 11, or stop.

With reference now to FIG. 11, exemplary method 1100 is illustrated. Method 1100 can provide for additional elements or aspects in connection with determining the rearrangement solution that rearranges existing VMs in accordance with certain embodiments of this disclosure. For example, at reference numeral 1102, the device can determine all or a portion of the potential rearrangement solution.

In addition, the device can determine respective rearrangement cost of the potential rearrangement solutions.

At reference numeral 1104, the device can determine the rearrangement solution subject to a first affinity constraint of the existing virtual machine or subject to a second affinity constraint of the virtual machine. Affinity constraints can relate to a request or requirement that two or more virtual machines are instantiated on a given server device or a given hierarchical group of server devices. Affinity (e.g., anti-affinity) constraints can also relate to a request or requirement that two or more virtual machines are not instantiated on a given server device or a given hierarchical group of server devices.

At reference numeral 1106, the device can determine an order of virtual machine instantiations request by the rearrangement solution and virtual machine terminations requested by the rearrangement solution. For example, the order can specify that instantiation of a given virtual machine is to be prior to termination of that virtual machine. As another example, the order can indicate that certain related virtual machines are to be instantiated or terminated together, or the like.

Example Operating Environments

To provide further context for various aspects of the subject specification, FIG. 12 illustrates an example wireless communication environment 1200, with associated components that can enable operation of a femtocell enterprise network in accordance with aspects described herein. Wireless communication environment 1200 comprises two wireless network platforms: (i) A macro network platform 1210 that serves, or facilitates communication with user equipment 1275 via a macro radio access network (RAN) 1270. It should be appreciated that in cellular wireless technologies (e.g., 4G, 3GPP UMTS, HSPA, 3GPP LTE, 3GPP UMB, 5G), macro network platform 1210 is embodied in a Core Network. (ii) A femto network platform 1280, which can provide communication with UE 1275 through a femto RAN 1290, linked to the femto network platform 1280 through a routing platform 1287 via backhaul pipe(s) 1285. It should be appreciated that femto network platform 1280 typically offloads UE 1275 from macro network, once UE 1275 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN1370 can comprise various coverage cells, while femto RAN 1290 can comprise multiple femto access points or multiple metro cell access points. As mentioned above, it is to be appreciated that deployment density in femto RAN 1290 can be substantially higher than in macro RAN 1270.

Generally, both macro and femto network platforms 1210 and 1280 comprise components, e.g., nodes, gateways, interfaces, servers, or platforms, which facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 1210 comprises CS gateway node(s) 1212 which can interface CS traffic received from legacy networks like telephony network(s) 1240 (e.g., public switched telephone network (PSTN), or public land mobile network (PLMN)) or a SS7 network 1260. Circuit switched gateway 1212 can authorize and authenticate traffic (e.g., voice) arising from such networks. Additionally, CS gateway 1212 can access mobility, or roaming, data generated through SS7 network 1260; for instance, mobility data stored in a VLR, which can reside in memory 1230. Moreover, CS gateway node(s) 1212 interfaces CS-based traffic and signaling and gateway node(s) 1218. As an example, in a 3GPP UMTS network, gateway node(s) 1218 can be embodied in gateway GPRS support node(s) (GGSN).

In addition to receiving and processing CS-switched traffic and signaling, gateway node(s) 1218 can authorize and authenticate PS-based data sessions with served (e.g., through macro RAN) wireless devices. Data sessions can comprise traffic exchange with networks external to the macro network platform 1210, like wide area network(s) (WANs) 1250; it should be appreciated that local area network(s) (LANs) can also be interfaced with macro network platform 1210 through gateway node(s) 1218. Gateway node(s) 1218 generates packet data contexts when a data session is established. To that end, in an aspect, gateway node(s) 1218 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 1214. It is to be noted that in 3GPP UMTS network(s), gateway node(s) 1318 (e.g., GGSN) and tunnel interface (e.g., TTG) comprise a packet data gateway (PDG).

Macro network platform 1210 also comprises serving node(s) 1216 that convey the various packetized flows of information or data streams, received through gateway node(s) 1218. As an example, in a 3GPP UMTS network, serving node(s) can be embodied in serving GPRS support node(s) (SGSN).

As indicated above, server(s) 1214 in macro network platform 1210 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 1210. Data streams can be conveyed to gateway node(s) 1218 for authorization/authentication and initiation of a data session, and to serving node(s) 1216 for communication thereafter. Server(s) 1214 can also effect security (e.g., implement one or more firewalls) of macro network platform 1210 to ensure network's operation and data integrity in addition to authorization and authentication procedures that CS gateway node(s) 1212 and gateway node(s) 1218 can enact. Moreover, server(s) 1214 can provision services from external network(s), e.g., WAN 1250, or Global Positioning System (GPS) network(s) (not shown). It is to be noted that server(s) 1214 can comprise one or more processor configured to confer at least in part the functionality of macro network platform 1210. To that end, the one or more processors can execute code instructions stored in memory 1230, for example.

In example wireless environment 1200, memory 1230 stores information related to operation of macro network platform 1210. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 1230 can also store information from at least one of telephony network(s)

1240, WAN(s) 1250, or SS7 network 1260, enterprise NW(s) 1265, or service NW(s) 1267.

Femto gateway node(s) 1284 have substantially the same functionality as PS gateway node(s) 1218. Additionally, femto gateway node(s) 1284 can also comprise substantially all functionality of serving node(s) 1216. In an aspect, femto gateway node(s) 1284 facilitates handover resolution, e.g., assessment and execution. Further, control node(s) 1220 can receive handover requests and relay them to a handover component (not shown) via gateway node(s) 1284. According to an aspect, control node(s) 1220 can support RNC capabilities.

Server(s) 1282 have substantially the same functionality as described in connection with server(s) 1214. In an aspect, server(s) 1282 can execute multiple application(s) that provide service (e.g., voice and data) to wireless devices served through femto RAN 1290. Server(s) 1282 can also provide security features to femto network platform. In addition, server(s) 1282 can manage (e.g., schedule, queue, format . . . ) substantially all packetized flows (e.g., IP-based) it generates in addition to data received from macro network platform 1210. It is to be noted that server(s) 1282 can comprise one or more processor configured to confer at least in part the functionality of macro network platform 1210. To that end, the one or more processors can execute code instructions stored in memory 1286, for example.

Memory 1286 can comprise information relevant to operation of the various components of femto network platform 1280. For example, operational information that can be stored in memory 1286 can comprise, but is not limited to, subscriber information; contracted services; maintenance and service records; femto cell configuration (e.g., devices served through femto RAN 1290; access control lists, or white lists); service policies and specifications; privacy policies; add-on features; and so forth.

It is noted that femto network platform 1280 and macro network platform 1210 can be functionally connected through one or more reference link(s) or reference interface(s). In addition, femto network platform 1280 can be functionally coupled directly (not illustrated) to one or more of external network(s) 1240, 1250, 1260, 1265 or 1267. Reference link(s) or interface(s) can functionally link at least one of gateway node(s) 1284 or server(s) 1286 to the one or more external networks 1240, 1250, 1260, 1265 or 1267.

FIG. 13 illustrates a wireless environment that comprises macro cells and femtocells for wireless coverage in accordance with aspects described herein. In wireless environment 1305, two areas represent "macro" cell coverage; each macro cell is served by a base station 1310. It can be appreciated that macro cell coverage area 1305 and base station 1310 can comprise functionality, as more fully described herein, for example, with regard to system 1300. Macro coverage is generally intended to serve mobile wireless devices, like UE $1320_A$, $1320_B$, in outdoors locations. An over-the-air (OTA) wireless link 1335 provides such coverage, the wireless link 1335 comprises a downlink (DL) and an uplink (UL), and utilizes a predetermined band, licensed or unlicensed, of the radio frequency (RF) spectrum. As an example, UE $1320_A$, $1320_B$ can be a 3GPP Universal Mobile Telecommunication System (UMTS) mobile phone. It is noted that a set of base stations, its associated electronics, circuitry or components, base stations control component(s), and wireless links operated in accordance with respective base stations in the set of base stations form a radio access network (RAN). In addition, base station 1310 communicates via backhaul link(s) 1351 with a macro network platform 1360, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1360 controls a set of base stations 1310 that serve either respective cells or a number of sectors within such cells. Base station 1310 comprises radio equipment 1314 for operation in one or more radio technologies, and a set of antennas 1312 (e.g., smart antennas, microwave antennas, satellite dish(es) . . . ) that can serve one or more sectors within a macro cell 1305. It is noted that a set of radio network control node(s), which can be a part of macro network platform 1360; a set of base stations (e.g., Node B 1310) that serve a set of macro cells 1305; electronics, circuitry or components associated with the base stations in the set of base stations; a set of respective OTA wireless links (e.g., links 1315 or 1316) operated in accordance to a radio technology through the base stations; and backhaul link(s) 1355 and 1351 form a macro radio access network (RAN). Macro network platform 1360 also communicates with other base stations (not shown) that serve other cells (not shown). Backhaul link(s) 1351 or 1353 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1355 link disparate base stations 1310. According to an aspect, backhaul link 1353 can connect multiple femto access points 1330 and/or controller components (CC) 1301 to the femto network platform 1302. In one example, multiple femto APs can be connected to a routing platform (RP) 1387, which in turn can be connect to a controller component (CC) 1301. Typically, the information from UEs $1320_A$ can be routed by the RP 1387, for example, internally, to another UE $1320_A$ connected to a disparate femto AP connected to the RP 1387, or, externally, to the femto network platform 1302 via the CC 1301, as discussed in detail supra.

In wireless environment 1305, within one or more macro cell(s) 1305, a set of femtocells 1345 served by respective femto access points (APs) 1330 can be deployed. It can be appreciated that, aspects of the subject innovation can be geared to femtocell deployments with substantive femto AP density, e.g., $13^4$-$10^7$ femto APs 1330 per base station 1310. According to an aspect, a set of femto access points $1330_1$-$1330_N$, with N a natural number, can be functionally connected to a routing platform 1387, which can be functionally coupled to a controller component 1301. The controller component 1301 can be operationally linked to the femto network platform 1302 by employing backhaul link(s) 1353. Accordingly, UE $1320_A$ connected to femto APs $1330_1$-$1330_N$ can communicate internally within the femto enterprise via the routing platform (RP) 1387 and/or can also communicate with the femto network platform 1302 via the RP 1387, controller component 1301 and the backhaul link(s) 1353. It can be appreciated that although only one femto enterprise is depicted in FIG. 13, multiple femto enterprise networks can be deployed within a macro cell 1305.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 13, in example embodiment 1300, base station AP 1310 can receive and transmit signal(s) (e.g., traffic and control signals) from and to wireless devices, access terminals, wireless ports and routers, etc., through a set of antennas $1312_1$-$1312_N$. It should be appreciated that while antennas $1312_1$-$1312_N$ are a part of communication platform 1325, which comprises electronic components and associated circuitry that provides for processing and manipulating of received signal(s) (e.g., a packet flow) and signal(s) (e.g., a broadcast control channel) to be transmitted. In an aspect, communication platform 1325 comprises a transmitter/receiver (e.g., a transceiver) 1366 that can convert signal(s) from analog format to digital format upon reception, and from digital format to analog format upon transmission. In addition, receiver/transmitter 1366 can divide a single data stream into multiple, parallel data streams, or perform the reciprocal operation. Coupled to transceiver 1366 is a multiplexer/demultiplexer 1367 that facilitates manipulation of signal in time and frequency space. Electronic component 1367 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1367 can scramble and spread information (e.g., codes) according to substantially any code known in the art; e.g., Hadamard-Walsh codes, Baker codes, Kasami codes, polyphase codes, and so on. A modulator/demodulator 1368 is also a part of operational group 1325, and can modulate information according to multiple modulation techniques, such as frequency modulation, amplitude modulation (e.g., M-ary quadrature amplitude modulation (QAM), with M a positive integer), phase-shift keying (PSK), and the like.

Figure 14:
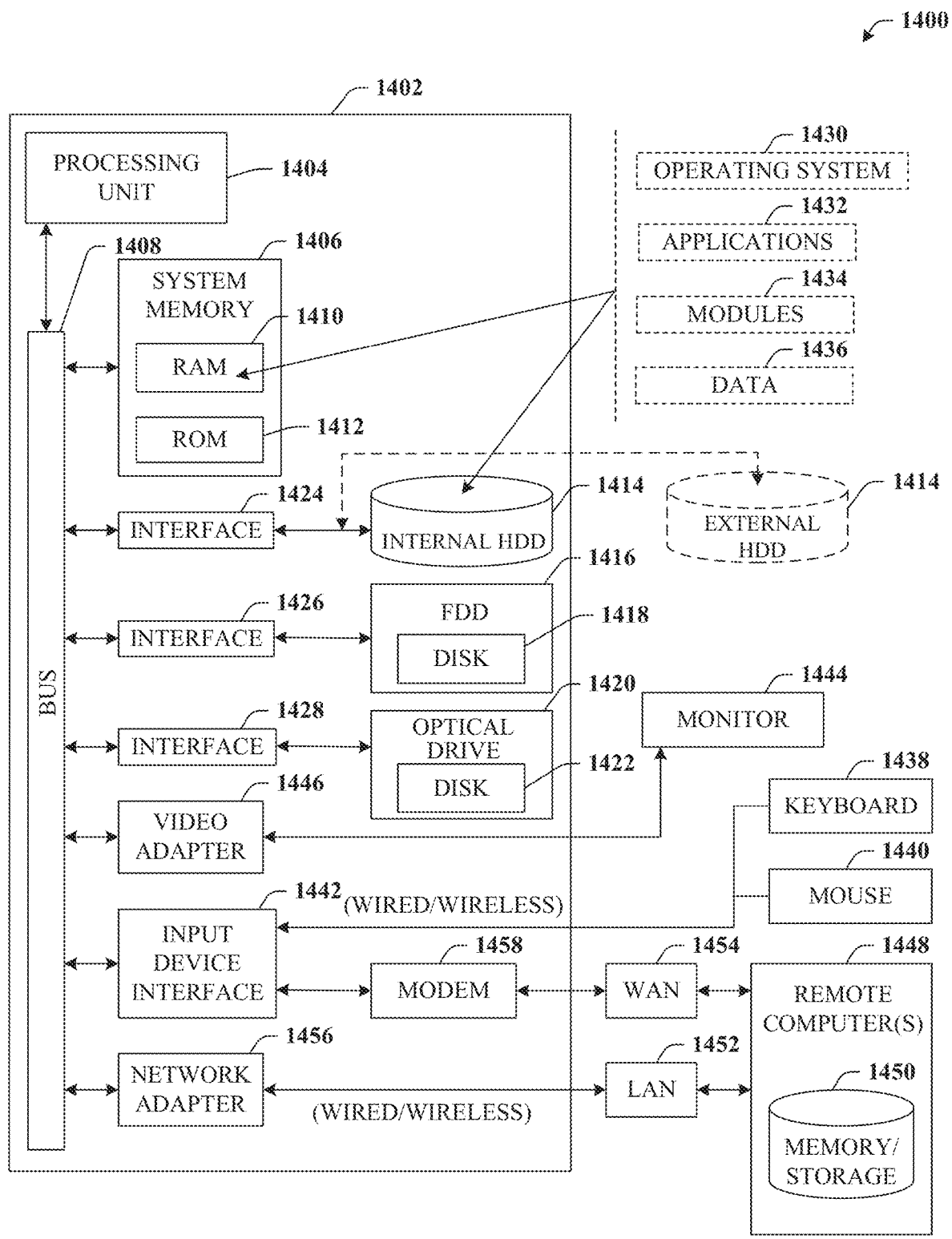
FIG. 14 illustrates an example block diagram of a computer operable to execute certain embodiments of this disclosure.

Referring now to FIG. 14, there is illustrated a block diagram of an exemplary computer system operable to execute the disclosed architecture. In order to provide additional context for various aspects of the disclosed subject matter, FIG. 14 and the following discussion are intended to provide a brief, general description of a suitable computing environment 1400 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the various methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically comprises a variety of computer readable media. Computer readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 14, the exemplary environment 1400 for implementing various aspects of the disclosed subject matter comprises a computer 1002, the computer 1402 including a processing unit 1404, a system memory 1406 and a system bus 1408. The system bus 1408 couples to system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 comprises read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also comprise a high-speed RAM such as static RAM for caching data.

The computer 1402 further comprises an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the disclosed subject matter can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may comprise a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE1394 serial port, a game port, a USB port, an IR interface, etc.

A monitor 1444 or other type of display device is also connected to the system bus 1408 via an interface, such as a video adapter 1446. In addition to the monitor 1444, a computer typically comprises other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, a mobile device, portable computer, microprocessor-based entertainment appliance, a peer device or other common network node, and typically comprises many or all of the elements described relative to the computer 1402, although, for purposes of brevity, only a memory/storage device 1450 is illustrated. The logical connections depicted comprise wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adapter 1456 may facilitate wired or wireless communication to the LAN 1452, which may also comprise a wireless access point disposed thereon for communicating with the wireless adapter 1456.

When used in a WAN networking environment, the computer 1402 can comprise a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
a processor; and
a memory that stores executable instructions that, when executed by the processor, facilitate performance of operations, comprising:
determining a hierarchy level for an array of server devices as a function of backplane communication channels associated with the array;
assigning a first server device of the array to a first group representative of a first common backplane communication channel of a defined hierarchy level, no greater than the hierarchy level, that is utilized by the first server device; and
determining a resource cost for communication between a first virtual machine executed by the first server device assigned to the first group and a second virtual machine executed by a second server device that is assigned to a second group, representative of a second common backplane communication channel utilized by the second server device, that differs from the first group.

2. The device of claim 1, wherein the first defined hierarchy level represents first backplane communication channels that serve respective chassis of server devices of the array.

3. The device of claim 2, wherein a second defined hierarchy level, no greater than the hierarchy level, represents second backplane communication channels that serve respective racks, comprising multiple chassis, of the server devices of the array.

4. The device of claim 3, wherein a third defined hierarchy level represents third backplane communication channels that serve respective nodes, comprising multiple racks, of the server devices of the array.

5. The device of claim 1, wherein the resource cost is determined as a function of a number of cuts between the first group to which the first server device is assigned and the second group to which the second server device is assigned, and wherein a cut of the cuts represents one of the backplane communication channels.

6. The device of claim 1, wherein the resource cost is a first resource cost, and wherein the operations further comprise determining a rearrangement cost representative of a second resource cost of transferring execution of the second virtual machine from the second server device to a third server device of the array that differs from the second server device.

7. The device of claim 6, wherein the operations further comprise determining a third resource cost for communication between the first virtual machine executed by the first server device and the second virtual machine executed by the third server device.

8. The device of claim 7, wherein the operations further comprise implementing a rearrangement solution that transfers execution of the second virtual machine from the second server device to the third server device in response to a determination that the rearrangement solution satisfies a defined efficiency threshold.

9. The device of claim 8, wherein the operations further comprise determining that the rearrangement solution satisfies the defined efficiency threshold in response to a determination that the first resource cost less the third resource cost is greater than the rearrangement cost.

10. The device of claim 8, wherein the rearrangement solution is determined to result in the third server device having threshold available server resources to allocate defined amounts of a server resource and instantiate the second virtual machine.

11. The device of claim 8, wherein the rearrangement solution satisfies an availability constraint that requests the third server device be situated in a specified geographical region or a topological region.

12. The device of claim 8, wherein the rearrangement solution satisfies an affinity constraint in which the first virtual machine shares an affinity with the second virtual machine.

13. The device of claim 12, wherein the affinity is a member of an affinity group, the affinity group comprising:
   a first affinity indicative of the first virtual machine and the second virtual machine being executed on a common server device of the array;
   a first anti-affinity indicative of the first virtual machine and the second virtual machine being executed on different server devices of the array;
   a second affinity indicative of the first virtual machine and the second virtual machine being executed on the different server devices, wherein the different server devices share the first common backplane communication channel of the defined hierarchy level; and
   a second anti-affinity indicative of the first virtual machine and the second virtual machine being executed on the different server devices, wherein the different server devices do not share the first common backplane communication channel of the defined hierarchy level.

14. A non-transitory machine-readable medium, comprising executable instructions that, when executed by a processor, facilitate performance of operations, comprising:
   determining a hierarchy level for an array of server devices as a function of a number of cuts, wherein a cut of the cuts represents a backplane communication channel from among backplane communication channels of the array;
   assigning a first server device of the array to a first group representative of a first cut of a first defined hierarchy level, no greater than the hierarchy level, that is utilized by the first server device; and
   determining a resource cost for communication between a first virtual machine executed by the first server device and a second virtual machine executed by a second server device that is assigned to a second group representative of a second cut utilized by the second server device.

15. The non-transitory machine-readable medium of claim 14, wherein the first defined hierarchy level represents first backplane communication channels that serve respective chassis of server devices of the array, wherein a second defined hierarchy level, no greater than the hierarchy level, represents second backplane communication channels that serve respective racks, comprising multiple chassis, of server devices of the array, and wherein a third defined hierarchy level, no greater than the hierarchy level, represents third backplane communication channels that serve respective nodes, comprising multiple racks, of server devices of the array.

16. The non-transitory machine-readable medium of claim 14, wherein the resource cost is determined as a function of a number of cuts between the first group to which the first server device is assigned and the second group to which the second server device is assigned.

17. A method, comprising:
   determining, by a device comprising a processor, a hierarchy level for an array of server devices as a function of backplane communication channels associated with the array;
   assigning, by the device, a first server device of the array to a first group representative of a first common backplane communication channel, of a first defined hierarchy level, no greater than the hierarchy level, that is utilized by the first server device;
   assigning, by the device, a second server device of the array to a second group representative of a second common backplane communication channel, of the first defined hierarchy level, that is utilized by the second server device; and
   determining, by the device, a resource cost for communication between a first virtual machine executed by the first server device and a second virtual machine executed by the second server device.

18. The method of claim 17, wherein the resource cost is a first resource cost, and further comprising determining, by the device, a rearrangement cost representative of a second resource cost of transferring execution of the second virtual machine from the second server device to a third server device of the array that differs from the second server device.

19. The method of claim 17, further comprising, determining, by the device, a third resource cost for communication between the first virtual machine executed by the first server device and the second virtual machine executed by the third server device.

20. The method of claim 17, further comprising, executing, by the device, a rearrangement solution that transfers execution of the second virtual machine from the second server device to the third server device in response to a determination that the rearrangement solution satisfies a defined efficiency threshold.

* * * * *